United States Patent [19]
Scott et al.

[11] Patent Number: 5,705,917
[45] Date of Patent: Jan. 6, 1998

[54] LIGHT WEIGHT MACHINE WITH ROTOR EMPLOYING PERMANENT MAGNETS AND CONSEQUENCE POLES

[75] Inventors: Harold C. Scott; Ardel R. Bednorz, both of Alamogordo; G. Weylin Johnson, Boles Acres; William J. Anderson, Alamogordo; Mitchell K. Davis, Fresnal Canyon; Henry Tally, Alamogordo, all of N. Mex.

[73] Assignee: Coleman Powermate, Inc., Kearney, Nebr.

[21] Appl. No.: 306,120

[22] Filed: Sep. 14, 1994

[51] Int. Cl.⁶ .................................................. H02P 9/14
[52] U.S. Cl. ........................... 322/46; 322/1; 310/156
[58] Field of Search .......................... 310/156; 322/1, 322/46

[56] References Cited

U.S. PATENT DOCUMENTS

| | | | |
|---|---|---|---|
| 4,217,538 | 8/1980 | Ziemacki | 322/29 |
| 4,788,486 | 11/1988 | Mashino et al. | 320/17 |
| 4,950,973 | 8/1990 | Kouba | 322/69 |
| 5,093,611 | 3/1992 | Nakamura et al. | 322/90 |
| 5,162,686 | 11/1992 | Royer | 310/156 |
| 5,359,248 | 10/1994 | Nagate et al. | 310/156 |
| 5,369,325 | 11/1994 | Nagate et al. | 310/156 |
| 5,510,662 | 4/1996 | Tanimoto et al. | 310/156 |

*Primary Examiner*—Steven L. Stephan
*Assistant Examiner*—Nicholas Ponomarenko
*Attorney, Agent, or Firm*—James H. Phillips; Michael A. Lechter

[57] ABSTRACT

A mechanically and electrically efficient, lightweight, portable motor-generator includes a stator having a plurality of windings and a rotor with a body of soft-magnetic material carrying a plurality of permanent, high energy product magnets in a surface near the stator such that relative motion of the rotor and stator causes magnetic flux from the permanent magnets to interact with and induce current in the stator windings. The magnets are mounted in insets formed in the rotor surface which includes portions between the insets to form respective consequence poles. The rotor is a hollow cylinder with the magnets mounted on an internal surface, and the stator is concentrically disposed within the cylinder. The stator includes first and second windings. A first rectification circuit, responsive to signals from the first stator winding, develops a relatively high voltage, low amperage DC signal; and a second rectification circuit, responsive to signals from the second stator winding, develops a relatively low voltage high amperage DC signal. In one preferred embodiment, the first and second windings are 3-phase, and the corresponding phases of the respective 3-phase windings are grouped together as a unit and wound about the core such that the corresponding phases of the respective 3-phase windings coils are wound in continuous thermal contact with each other. Each phase of at least one winding includes a first portion defined by a tap to provide a third voltage output.

13 Claims, 18 Drawing Sheets

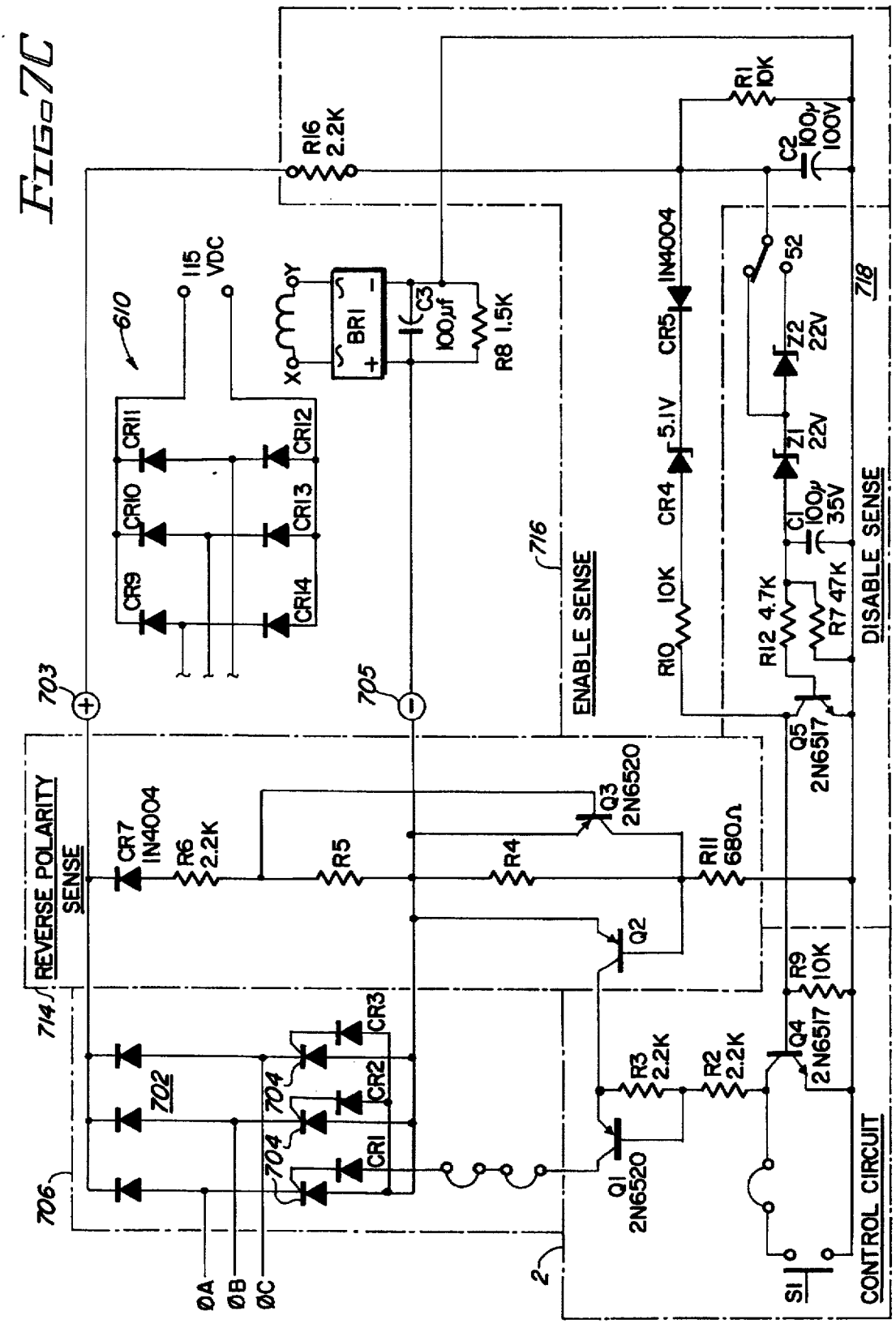

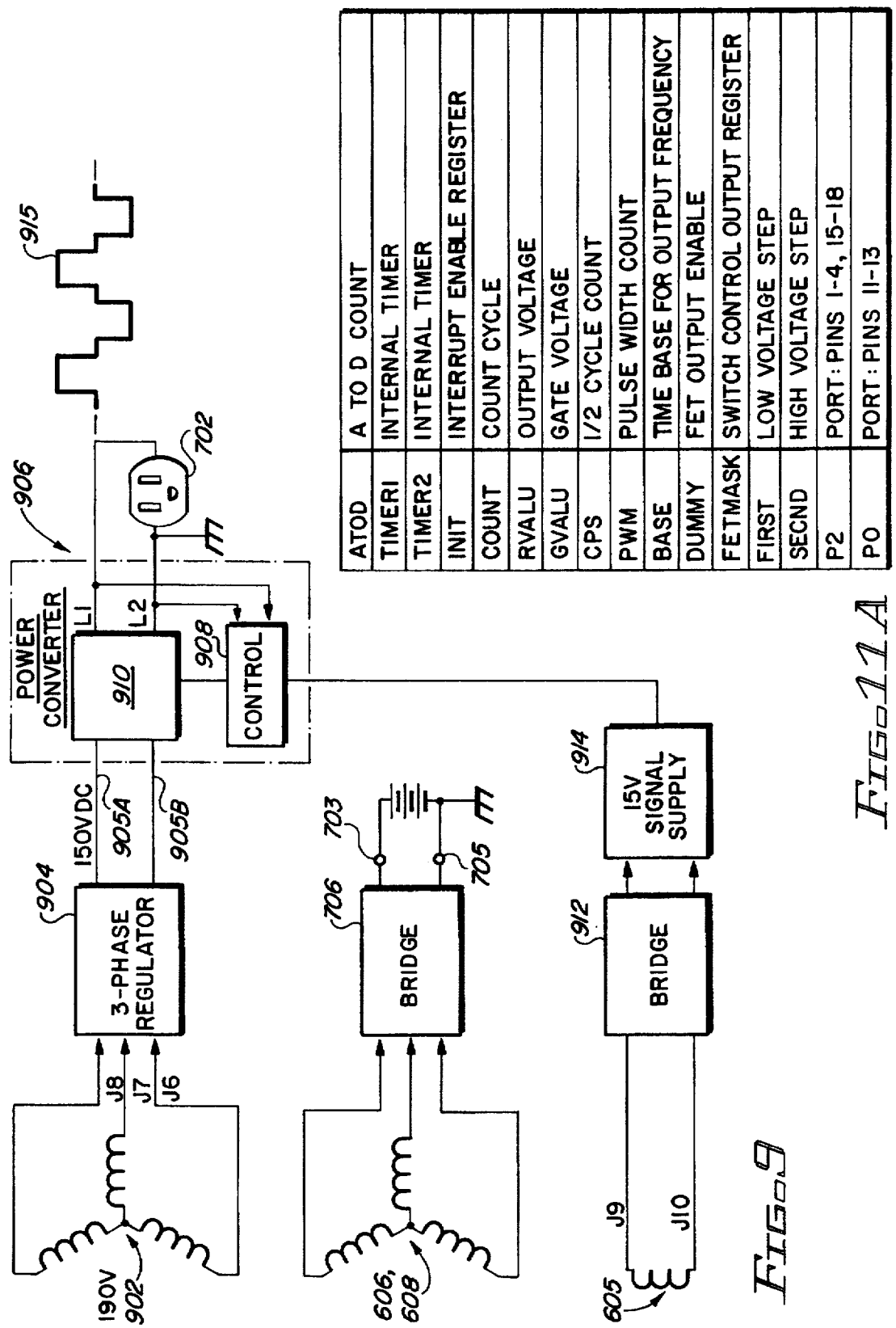

# 5,705,917

LIGHT WEIGHT MACHINE WITH ROTOR EMPLOYING PERMANENT MAGNETS AND CONSEQUENCE POLES

BACKGROUND OF INVENTION

The present invention relates to lightweight portable electrical generators.

In general, portable DC generators are known. Portable generators commonly comprise a conventional diesel or gasoline powered engine having a crankshaft coupled to a generator. The generator includes a stationary stator, and a rotor disposed for rotation with the engine shaft. The rotor generates a magnetic field. As the magnetic field intercepts windings on the stator, electrical current is induced. The induced current is typically applied to a bridge rectifier, sometimes regulated, and provided as an output. Examples of such prior art generators include the Generac G1000 (950 watts and 49 pounds), the Honda EX1000 (1000 watts and 57 pounds) and the Yamaha EF1000 (1000 watts and 55 pounds). While typically not found in portable units, an AC output can be provided by applying the DC signal to an inverter.

While referred to as portable, the prior art generator units tend to be heavy and unwieldy, or are incapable of providing sustained power sufficient for typical uses. Further, the prior art units typically provide either a relatively low amperage, high voltage (e.g., 115 volts) output, or a relatively low voltage, high amperage output (e.g., 12 or 24 volts, at from 25 to 200 amperes) and weigh from approximately 40 to 65 pounds, dry weight. In many instances, however, it is desirable to have both high voltage low current outputs, e.g., to run lights or power tools, and a low voltage high amperage output for, e.g., charging batteries or jump starting a car from a unit that is easily carried by one person using a shoulder strap.

SUMMARY OF THE INVENTION

The present invention provides a truly lightweight generator capable of providing sustained power sufficient for typical uses. In accordance with one aspect of the present invention, a light weight generator is implemented employing a rotor utilizing high energy product permanent magnets.

In accordance with another aspect of the present invention, the rotor is mounted directly on the engine shaft. The rotor is sufficiently close coupled to the engine that an air gap between the stator and rotor is maintained without bearings other than those normally employed in the engine.

In accordance with another aspect of the present invention, the rotor is of multiple pole design with half of the poles consisting of high density magnets and the other half of the poles consisting of consequence poles, therefore obtaining maximum use of the high density magnets.

In accordance with another aspect of the present invention, a multi-winding stator is employed to provide both low voltage high amperage output, e.g., for battery charging, and a high voltage low amperage output, e.g., for operating lights and power tools.

In accordance with another aspect of the present invention, two alternative low voltage high amperage outputs may be provided, e.g., 12 volts and 24 volts.

In accordance with another aspect of the present invention, the ratio of the generator power output to rotor weight is in excess of 150 or 200, preferably in excess of 500, more preferably in excess of 700, and most preferably in excess of 800 watts per pound.

BRIEF DESCRIPTION OF THE DRAWING

The present invention will hereinafter be described in conjunction with the figures of the appended drawing wherein like designations denote like elements and:

FIG. 7C is a schematic diagram of the control circuitry;

FIG. 9 is a block schematic of a control circuit including an inverter;

FIGS. 11A-11F are a schematic memory map and flow chart of the inverter operation.

Paragraph

DETAILED DESCRIPTION OF A PREFERRED EXEMPLARY EMBODIMENT

Figure 1:
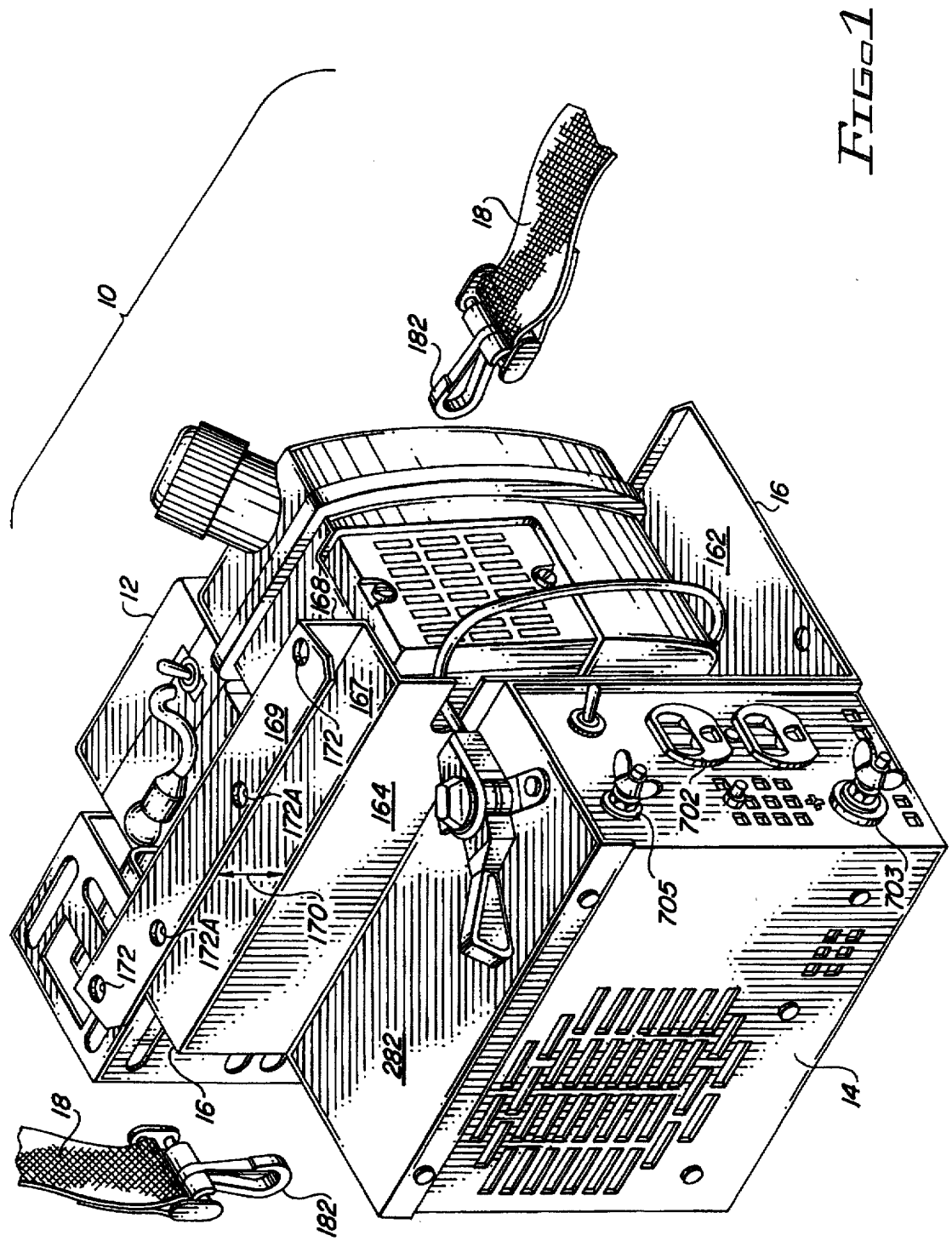
FIG. 1 is a pictorial illustration of the light weight portable genset in accordance with a general aspect of the present invention.
Figure 2:
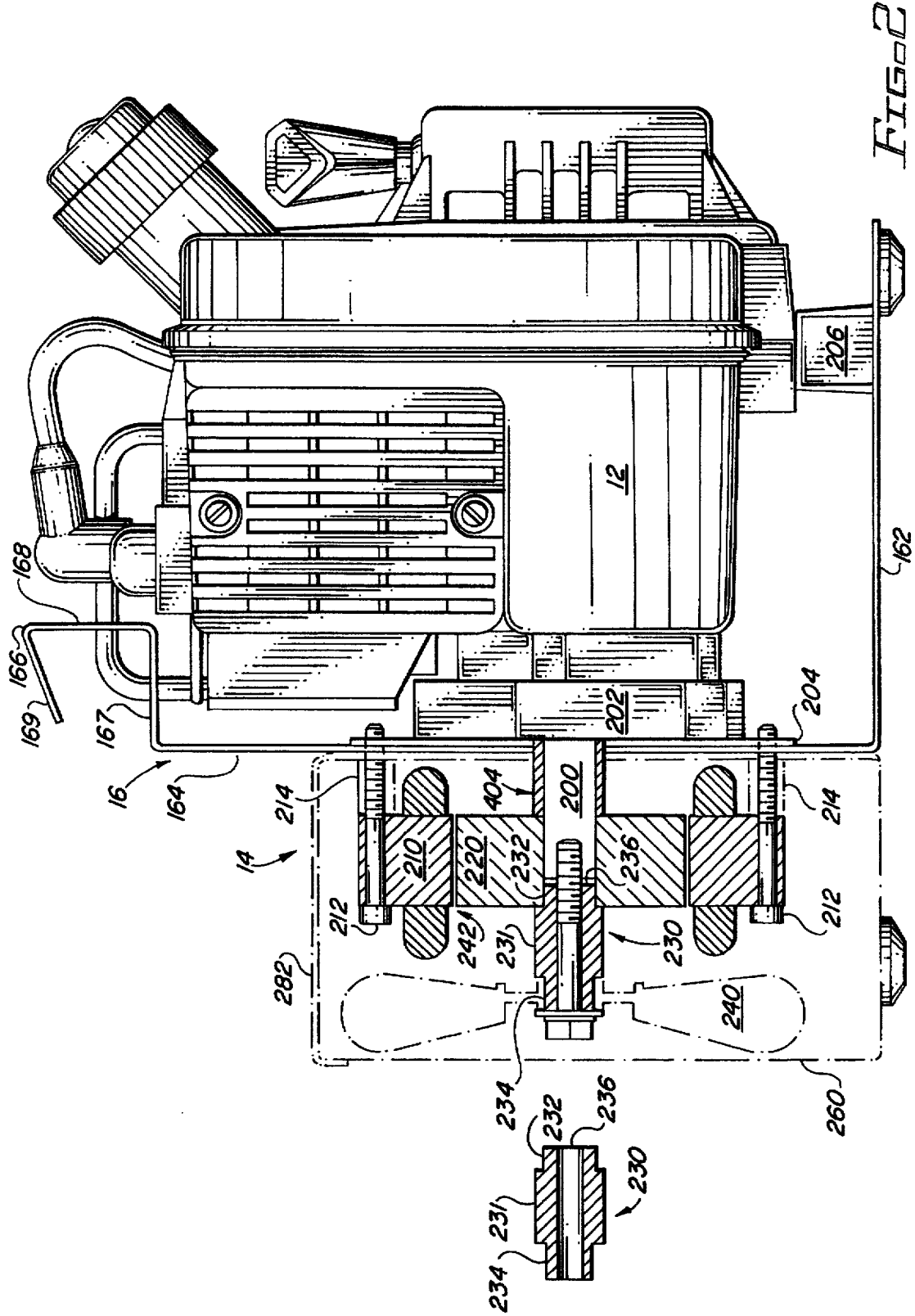
FIG. 2 is a partial sectional side view of the genset of FIG. 1.

Referring to FIGS. 1 and 2, a lightweight portable generator in accordance with the present invention comprises an engine 12, a high output miniature generator unit 14, and a mounting frame 16.

Figure 3:
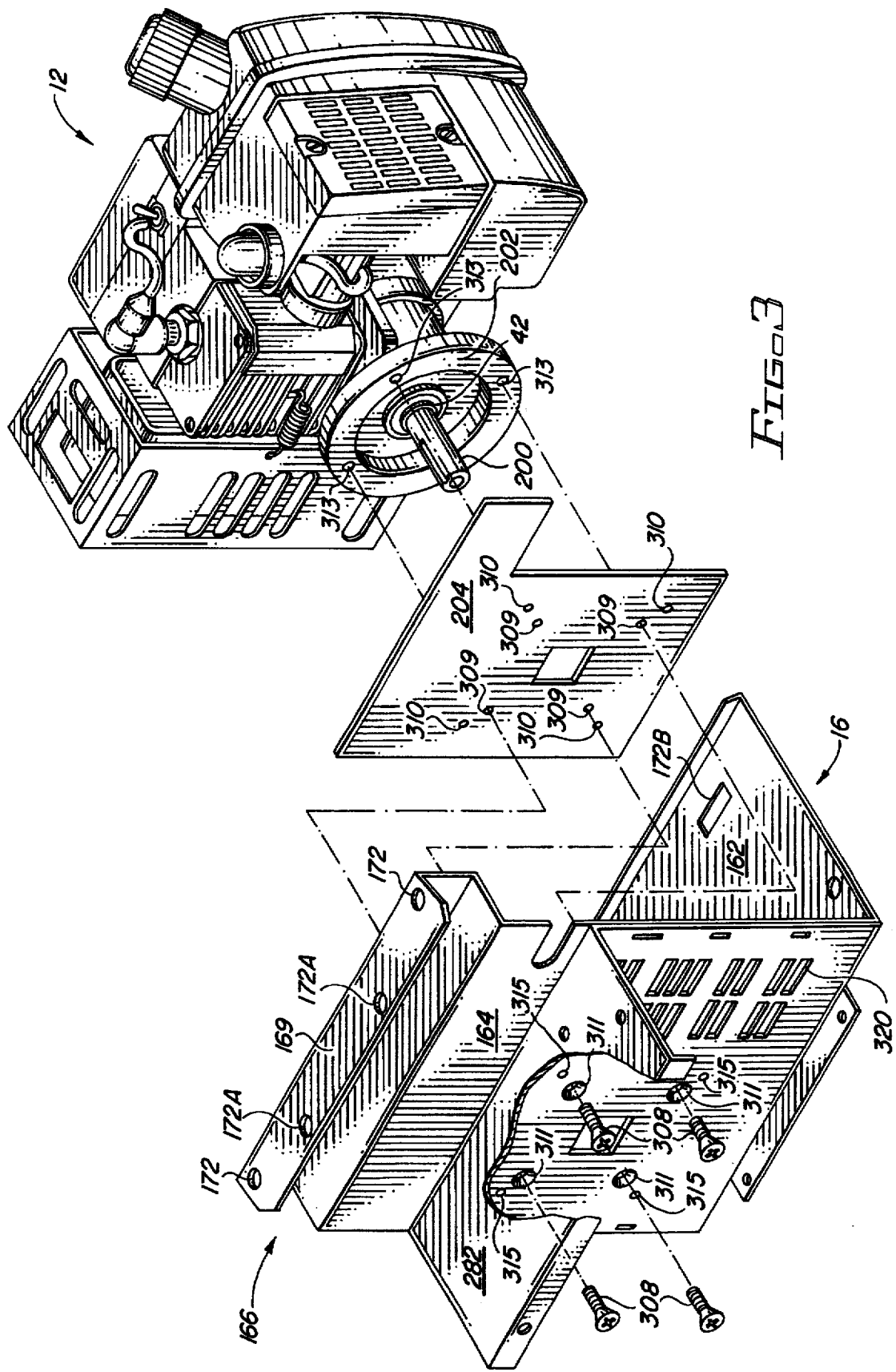
FIG. 3 is an exploded pictorial view of the engine, frame and mounting plate of the genset of FIG. 1.

As best seen in FIGS. 2 and 3, engine 12 suitably includes a shaft 200 extending outwardly from a shoulder 42. Engine 12 may be any small high RPM engine with a high horsepower to weight ratio capable of turning a shaft. In the preferred embodiment, engine 12 is a 2.0 horsepower, two-cycle internal combustion engine, having a displacement of 3 cubic inches and weighing 7½ pounds, such as a Tecumseh TC300.

Referring now to FIGS. 1, 2 and 3, frame 16 provides a lightweight common mount for engine 12 and generator unit 14. Frame 16 is suitably formed of a lightweight rigid, electrically and thermally conductive material such as, for example, aluminum. In the preferred embodiment, an aluminum sheet is bent to provide foot 162, upright 164 and handle 166 portions of frame 16. The aluminum sheet is bent at a predetermined distance from one end to form foot 162, and perpendicular upright section 164. Handle 166 suitably comprises a first portion 167 bent from upright 164 to overlay foot 162; an upright section 168; and a forwardly facing lip 169 preferably angled, which cooperate to form a channel 170 into which an operator's finger may fit, to facilitate carrying the unit.

If desired, handle 166 may be adapted to accommodate a strap or a light. For example, respective apertures 172 are formed through the lip of handle 166 at either side through which suitable clips of a strap 18 are received. Respective apertures 172A are formed through the lip of handle 166 for the mounting of a flood light.

As will hereinafter be described, engine 12 and generator unit 14 are mounted on opposing sides of frame upright 164. As best seen in FIGS. 2 and 3, engine 12 is mounted to upright 164, overlying foot 162.

A mounting plate 204 is interposed between engine 12 and frame upright 164 to provide structural strength to upright 164, and provide a medium for mounting engine 12 and the stator 210 to frame 16. To facilitate mounting of engine 12 and stator 210, plate 204 suitably includes first and second sets of apertures 309 and 310. Apertures 309 are suitably disposed in registry with corresponding apertures 311 (suitably countersunk) in frame upright 164, and threaded bores 313 in motor flange 202. Engine 12 is suitably fixed to upright 164 by a predetermined number (e.g. 4) of screws 308 (FIG. 3) which are journaled through apertures 311 in upright 164, and apertures 309 in mounting plate 204, and are threaded into bores 313 motor flange 202. As shown in FIG. 3 mounting plate 204 can, if desired, be extended upward to the bend of frame 16 between upright 164 and handle 166 to add mechanical strength to upright section 168 for mounting an optional flood light. If desired, a mounting block 206, suitably a soft rubber block to absorb vibration, may be interposed between foot 162, and engine 12, at the distal end of foot 162. If desired, rectangular aperture 172(b) may be provided in foot 162 to accommodate an optional lock kit. As previously discussed, apertures 310 are suitably threaded to facilitate mounting of the generator stator 210. Accordingly, plate 204 is suitably formed of a rigid material sufficiently thick to accommodate threaded apertures 310, such as, e.g. a 10-gauge plate.

Figure 4:
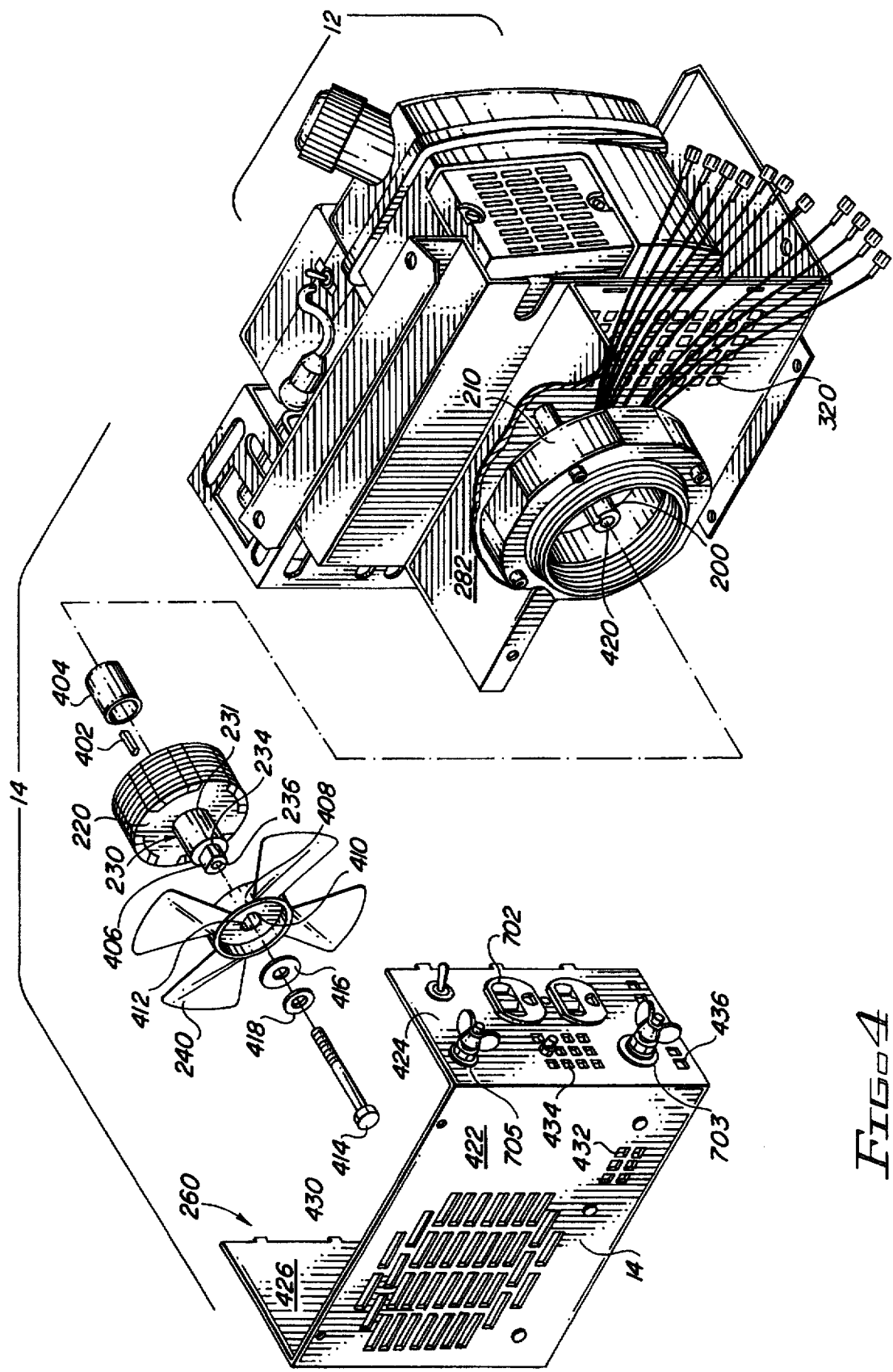
FIG. 4 is an exploded view of the generator unit of the genset of FIG. 1.

Referring now to FIGS. 2, 3 and 4, generator unit 14 preferably comprises a stator 210, a rotor 220, a fan shaft extension 230, a fan 240 and electronic control circuitry 250, all disposed within a housing 260 and top plate 282.

Stator 210 is disposed concentrically with engine shaft 200, offset by a predetermined distance from frame upright 164. More specifically, stator 210 is fixedly mounted to frame upright 164 (and hence engine 12), and concentricity with engine shaft 200 maintained, by respective bolts 212. An offset from upright 164 is maintained by respective spacers 214. Bolts 212 extend through bores in stator 210, spacers 214, apertures 315 in frame 164, and are threaded into holes 310 in plate 204. As previously noted, plate 204 provides the structural integrity for mounting stator 210.

Figure 6:
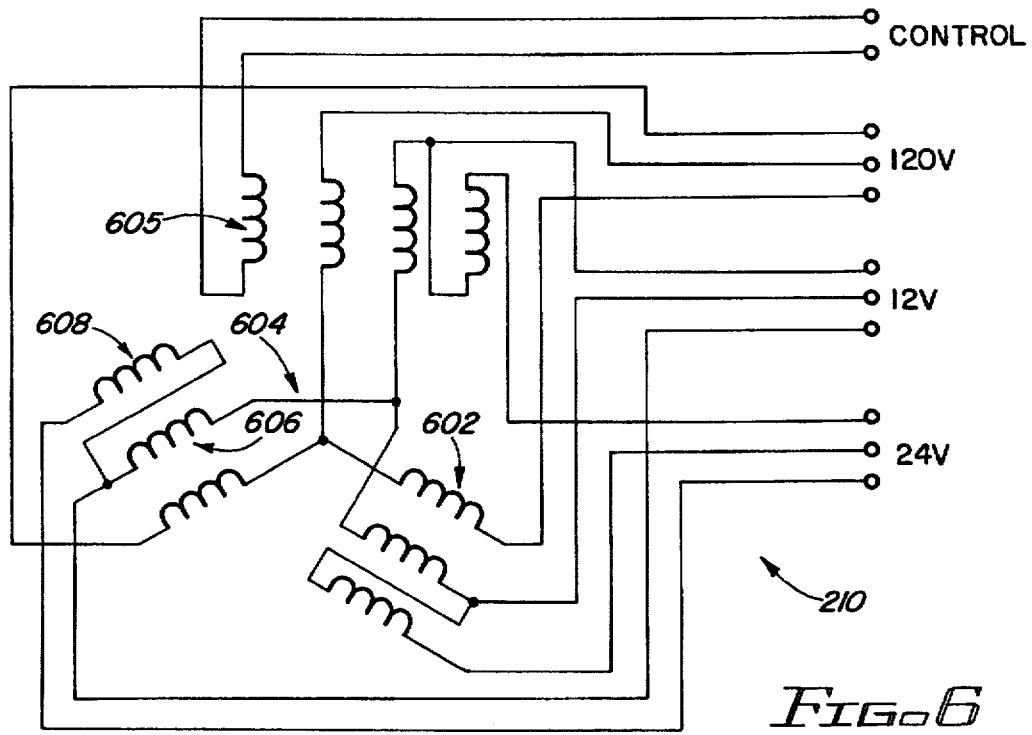
FIG. 6 is a schematic diagram of the stator windings.
Figure 7A:
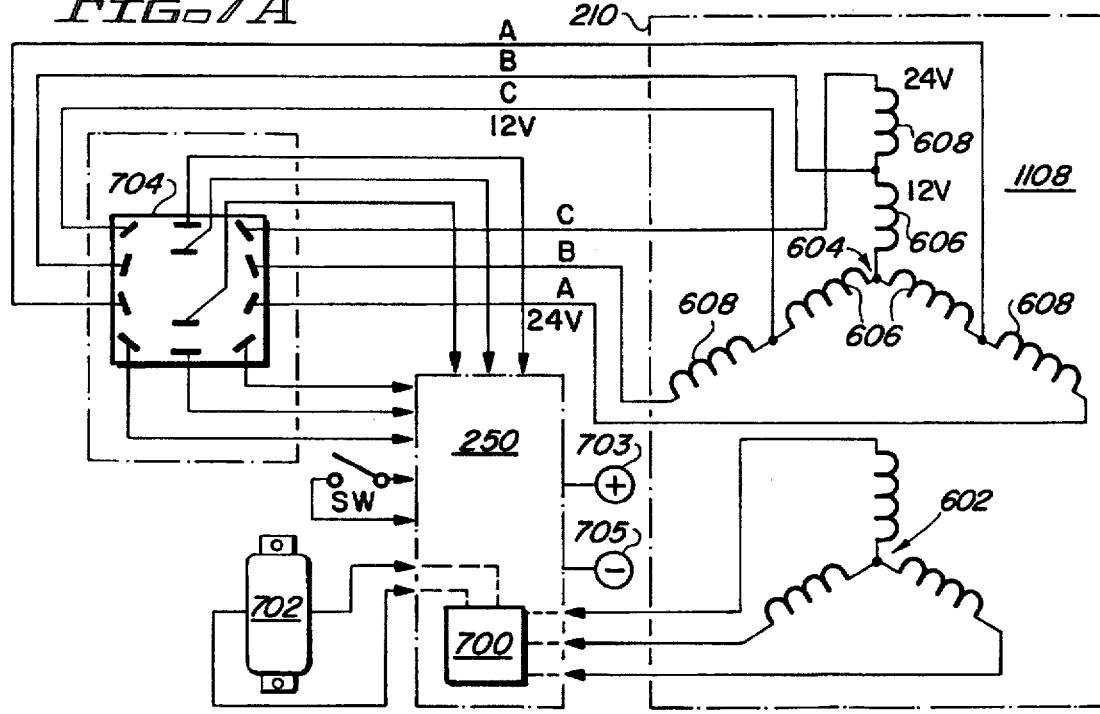
FIG. 7A is a block schematic of the stator windings and control circuitry.

As will be more fully discussed, in conjunction with FIGS. 6 and 7A, Stator 210 preferably includes a plurality of three-phase windings to generate first and second low-voltage, high-amperage outputs and a high-voltage, low-current output, preferably wound with the respective coils of each phase grouped together, and concurrently wound about a laminate core as a unit to provide particularly advantageous heat dissipation characteristics.

Referring briefly to FIG. 6, stator 210 suitably comprises two 3-phase windings, and a single-phase control coil that is wound together with the first phase of each 3-phase winding. More specifically, stator 210 includes a first and second 3-phase star windings 602 and 604, and single phase central winding 605 (wound together with the first phase windings). First winding 602 suitably provides a high voltage, low current output and is formed of a relatively small diameter, e.g., 24 gauge wire. Winding 604 suitably provides respective low-voltage (e.g. 12 and 24 volt), high current output. Each phase of winding 604 suitably includes a first portion 606, defined by a tap to provide a first low voltage (e.g. 12-volt) high current output, and a second portion 608, from which a second low-voltage, (e.g., 24-volt), high-current output is taken. Windings 606 and 608 are formed of multiple 24 gauge wires in parallel preferably within a common insulative sleeve. The effective diameter of winding 606 wire is approximately twice that of winding 608, e.g. 15 gauge and 18 gauge wire, respectively. The respective coils of each phase of windings 602 and 604 include a predetermined number of turns corresponding to the voltage output associated with that particular coil. The cumulative turns of coils 606 and 608 provide a second low-voltage, high-current output, e.g., 24-volts. For example, in the preferred embodiment, 12-volt coil 606 includes 5 turns, 24-volt coil 608 includes an additional 4 turns (for an effective total of 9) and high-voltage (e.g. 115 watts) coil 602 includes a total of 29 turns in each phase.

In physical assembly, the respective coils corresponding to the high-voltage, and first and second low-voltages of each phase (and the control winding in the first phase) are grouped together as a unit and concurrently wound about a laminate core together, as a unit. In this manner, the respective coils are wound in close proximity, in thermal contact in effect, sharing the same space. This arrangement is particularly advantageous in a number of respects: a single stator generates a plurality of voltages; maximum wattage output can be obtained from any of the coils; and, the coils not in use operate as a heat sink for the working winding. The close proximity of the respective coils effectively makes the entire mass of the skein available to dissipate the heat generated by the working winding.

Rotor 220 is mounted on engine shaft 200 in coaxial disposition with stator 210, separated from stator 210 by a relatively small predetermined air gap 242, e.g. in the range of 0.020 to 0.060 inch, and preferably 0.030 inch. Specifically, engine shaft 200 is received in a central axial bore in rotor 220. A key 402 (FIG. 4) ensures a positive rotation of stator 220 with shaft 200. A spacer 404 is disposed on shaft 200 to axially align rotor 220 with stator 210.

Rotor 220 is preferably a permanent magnet rotor, of sufficiently light weight that it can be maintained in axial alignment with, and rotated in close proximity to stator 210, (i.e. with air gap 242 of less than approximately 0.060 inch), without the necessity of any bearings in addition to those conventionally included within engine 12. Rotor 220 suitably manifests a generator output power to rotor weight ratio in watts per pound of in excess of 150 or 200, preferably in excess of 500, more preferably in excess of 700, and most preferably in excess of 800. The preferred embodiment manifests in a generator output power to rotor weight ratio in the range of 800 to 900 in watts per pound. For example, for a 2-kilowatt unit, rotor 220 would suitably weigh no more than approximately 2.40 pounds. Similarly, for a 900-watt unit rotor 220 preferably weighs no more than 1.06 pounds. As will be more fully discussed in conjunction with FIG. 8, in the preferred embodiment, this is achieved economically by employing high energy product magnets, and consequence poles.

Fan extension 230, disposed in axial alignment with shaft 200, is employed to couple fan 240 to shaft 200. Extension 230 suitably comprises a generally cylindrical body 231, with respective reduced diameter ends 232 and 234 (best seen in FIG. 2), and includes a centrally-disposed axial bore 236. Reduced-diameter end 232 is received within the central bore of rotor 220 with the step to body 231 abutting the front surface of rotor 220. Fan 240 is mounted for rotation with shaft 200, to generate air movement to cool the various elements of generator unit 14, and particularly, stator 210 and electronic-controlled circuitry 250. Fan 240 suitably includes a plurality of blades, e.g. 5, mounted about a hub 408. Hub 408 suitably includes a central bore 410 generally conforming in cross-section to end 236 of extension 230, e.g. includes a flat 412 corresponding to flat 406. Fan 240 is mounted on extension 230 for rotation with shaft 200; fan 240 is suitably formed of a relatively lightweight plastic such as, for example, Celcon. End 234 of extension 230 is received within central bore 410 of fan 240. Extension end flat 406 cooperates with flat 412 in bore 410 to ensure positive rotation of fan 240 with shaft 230.

Rotor 220, extension 230, and fan 240 are secured as a unit to engine shaft 200 by bolt 414, and a tensioning mechanism such as a washer 416 and a split washer 418. Bolt 414 is journaled through washers 416 and 418, and through the central bore of fan shaft extension 230, and threadedly engages an axial bore 420 in the end of engine shaft 200. The tensioning mechanism tends to prevent bolt 414 from disengaging with shaft 200.

Housing 260 and a top plate 282 cooperate to enclose stator 210, rotor 220, fan 240 and control circuit 250. Top plate 282 extends perpendicularly from frame upright 164, suitably affixed to upright 164 by, e.g., bolts, rivets or welding. Housing 260 is suitably affixed, e.g., bolted, to top 282, and frame 16. As will hereinafter be more fully discussed, housing 260 is formed of a relatively lightweight thermally and electrically conductive material and is suitably employed as an electrical ground for circuitry 250, as well as a thermal heat sink to facilitate cooling.

Figure 5:
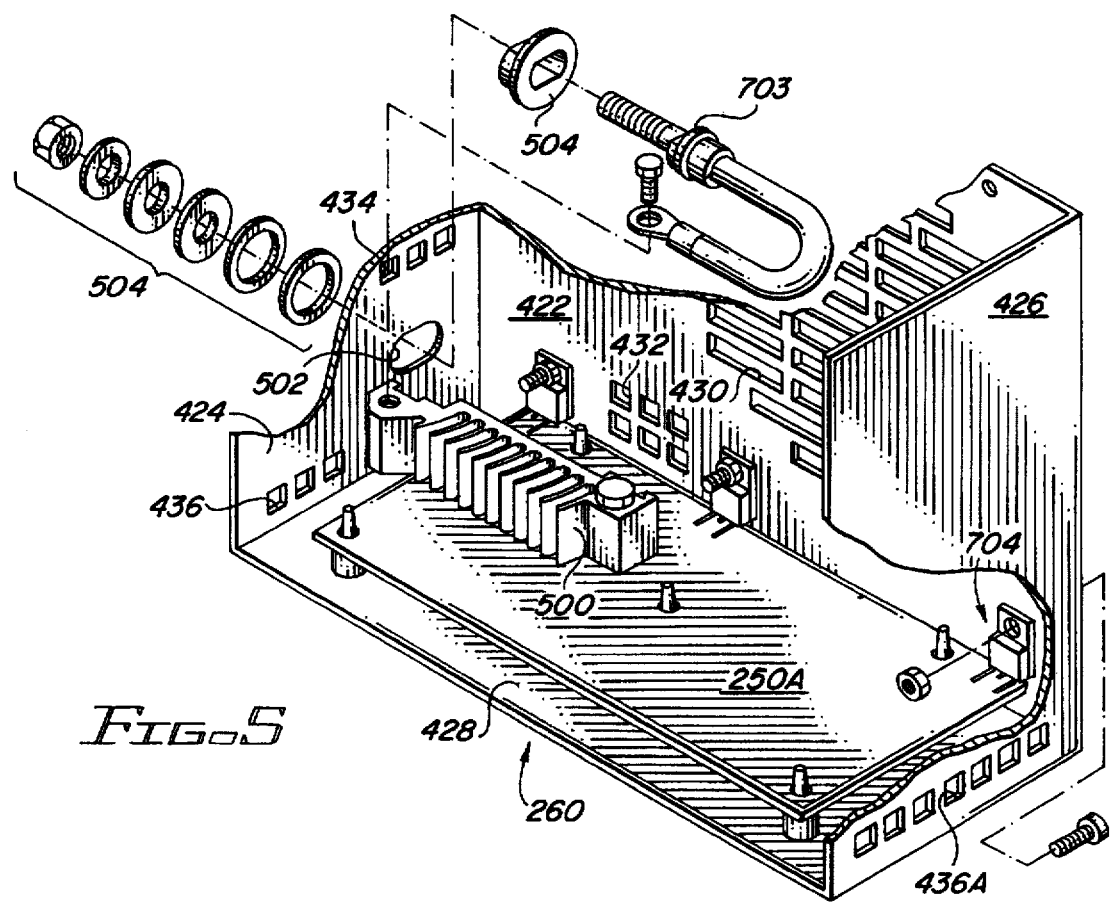
FIG. 5 is a partially cut-away pictorial view of the generator unit housing and control circuitry board.

Referring now to FIGS. 3, 4 and 5, housing 260, top 282 and frame upright 164 cooperate to, in effect, define a closed structure with pre-defined apertures (e.g. grills) in predetermined positions to define an airflow path to facilitate cooling of the elements of generator 14. Specifically, a grill 320 (best seen in FIGS. 3 and 4) is formed in frame upright 164. Housing 260 includes a face 422 and respective sides 424 and 426 (best seen in FIGS. 4 and 5) and a bottom 428. A first grill 430 and second smaller series of apertures 432 are formed at predetermined positions through face 422. Additional sets of apertures 434 and 436 are suitably formed through side wall 424 and, if desired, apertures 436A are formed through side wall 426. Grill 430 is disposed in a general alignment with fan 240. In operation, fan 240 draws air into the enclosure through grill 430, creating a positive pressure in the interior of the enclosure, and forcing air to exit through grill 320 in upright 164 and apertures 432, 434, 436 and 436A. Apertures 432, 434, and 436 are strategically placed to cause airflow over specific heat-sensitive components. Additionally, the action of fan 240 itself causes an airflow in a radial direction off of the tips of fan 240. Particularly heat sensitive components are preferably disposed in the radial air-flow generated by fan 240, e.g., a heat sink 500 for heat-sensitive electronic components is disposed radially offset from, but axially aligned. Heat sink 500 can be of various shapes and dispositions (see FIG. 5A). The use of a fan directly coupled to motor shaft 200 is particularly advantageous in that airflow varies as a function of need. The higher the rpm of the engine, the more power is generated, and concomitantly, more heat is generated by the components. However, as the engine rpm increases, the airflow generated by fan 240 also increases to accommodate the additional heat generated.

Figure 5A:
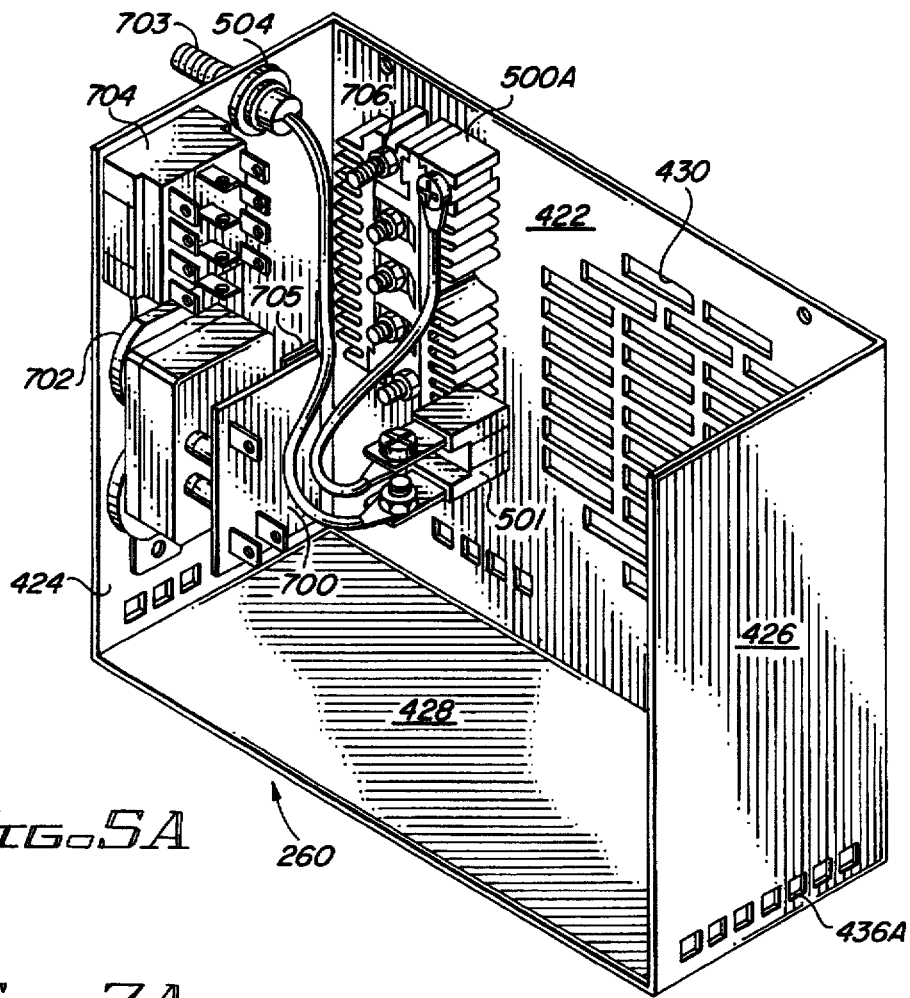
FIG. 5A is an inside view of an alternative version of the generator unit housing.

Control circuitry 250 rectifies the signals from the stator coils. Control circuitry 250 may comprise any suitable rectification circuits to convert the signals from stator 210 to appropriate DC signals. Referring to FIGS. 5, and 5A, control circuitry 250 suitably comprises a first full wave bridge rectifier 706 (high-voltage, low-current) cooperating with a heat sink 500 (500A in FIG. 5A); a fuse 501; a suitable switch 704; and a second rectifier 700 (high voltage, low current). Control circuitry 250 suitably cooperates with a suitable conventional duplex receptacle (outlet) 702; three-pole double throw switch 704, and positive and negative post terminals 703 and 705. The components of control circuitry 250 and cooperating elements can be variously disposed within housing 260. Alternative dispositions are shown in FIGS. 5 and 5A.

Referring to FIG. 5A, rectifier 706 and fuse 501 may suitably be disposed on face 422. Rectifier 706 suitably comprises a diode bridge with the diodes sized to withstand a short-circuit output greater than that capable of being produced within the power limitations of engine 12. Fuse 501 protects the diodes of rectifier 706 from a reverse polarity connection at terminals 703 and 705, during, e.g. a battery charging operation.

Outlet 702 and terminal posts 703 and 705 suitably extend through, and switch 704 is mounted on, sidewall 424. Terminals 703 and 705, can, however, be disposed elsewhere on housing 260, as desired, to accommodate the particular configuration and disposition of components employed in control circuit 250. For example, while positive terminal 703 is shown at the top of wall 424 in FIG. 5A, and negative terminal 705 shown lower in the wall, relative positions can be reversed (see FIGS. 1 and 5).

Rectifier 700 can be mounted on sidewall 424, or, if desired, can be formed as a separate assembly mounted on the back of outlet 702.

As will be hereinafter be discussed, positive terminal 703 is electrically isolated from wall 424 by suitable insulative washers 504. Negative terminal 705 is electrically (and mechanically) connected to side wall 424. As will be discussed, housing 260 serves as both electrical ground and heat sink to various elements of circuit 250.

Referring now to FIG. 7A, high-voltage low-current winding 602 is suitably connected to 3-phase bridge 700. The output of rectifier 700 is connected to duplex receptacle 702. The respective low-voltage, high-current outputs of winding 604, i.e. from windings 606 and 608, are applied to the respective throw terminals of 3-pole double throw switch 704. The poles of switch 614 are connected to control circuit 250 (rectifier 706; FIG. 5A), which provide low-voltage, high-current output at terminals 703 and 705.

In operation, engine 12 rotates shaft 200, and rotor 220 and fan 240 rotate concomitantly. Rotation of rotor 220 causes current to be induced in the coils of the stator 210.

The respective outputs of stator 210 are selectively applied to control circuit 250, which suitably rectifies the signals to provide the desired low-voltage, high-amperage output signals at positive and negative output terminals 703 and 705 for uses such as charging batteries, and high-voltage, low-current at duplex receptacle 702 for powering conventional power tools, lights, and the like.

Figure 7B:
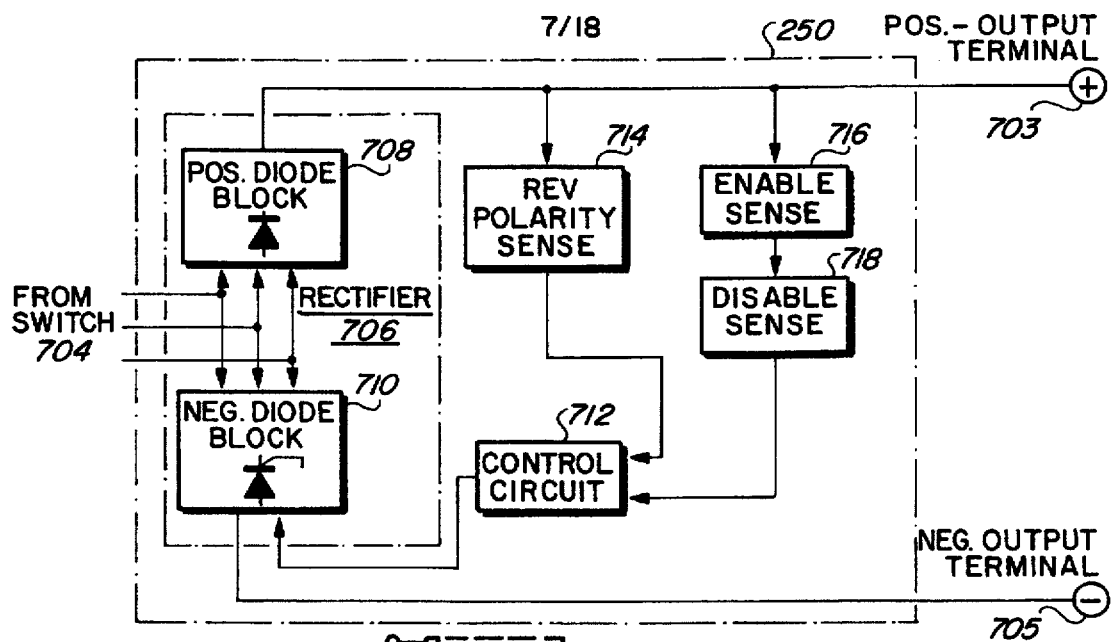
FIG. 7B is a block schematic of the control circuitry of the genset of FIG. 1.
Figure 8A:
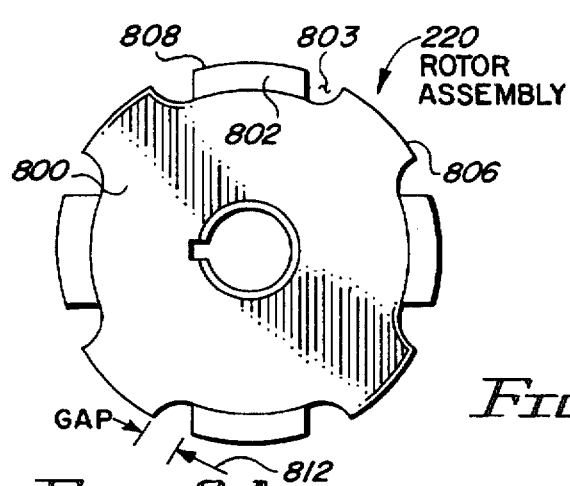
FIGS. 8A, 8B, 8C and 8D are front, side sectional, and exploded front views of a rotor in accordance with one aspect of the present invention.
Figure 8B:
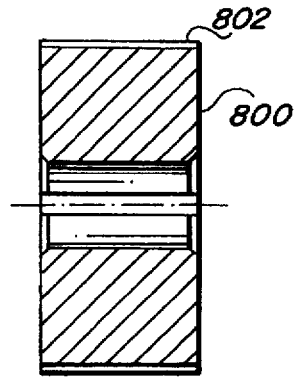
Figure 8D:
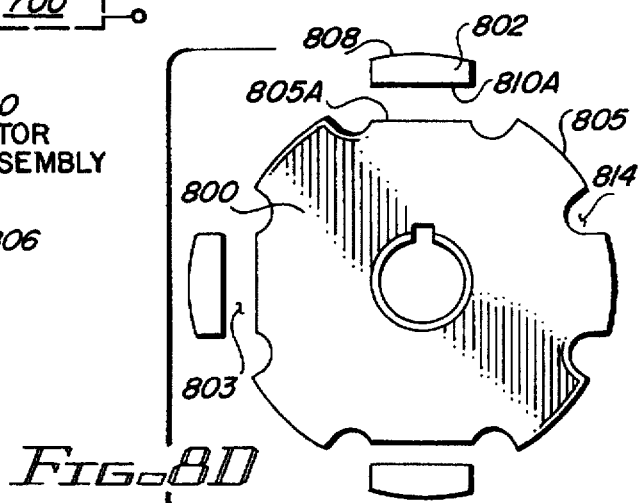
Figure 8C:
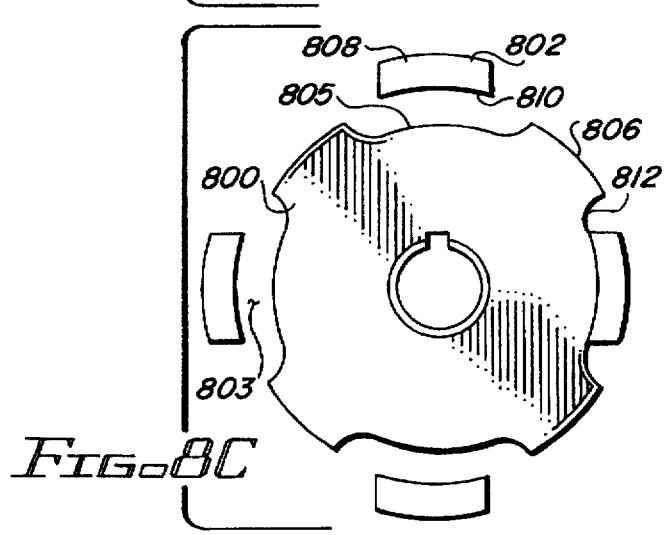

As shown in FIGS. 7A and 7B, control circuitry 250 may also comprise, if desired, various circuits to provide certain protection functions, in addition to, or in lieu of fuse 501. The protection circuits are advantageously disposed on a printed circuit board 250A (FIG. 5). With specific reference to FIGS. 7B and 7C, in such control circuit rectifier 706 is preferably SCR-controlled, i.e., comprises a positive diode block 708, and a negative diode block 710 formed of silicon-controlled rectifiers (SCR's) cooperating with a suitable control circuit 712. Control circuit 712, in turn, cooperates with respective sensing circuits such as, for example, a reverse-polarity sensor 714, and enable and disable sensors 716 and 718.

Reverse polarity sensor 714 suitably disables control circuitry 712 (and hence rectifier 706) if it senses a reverse polarity voltage in excess of a pre-determined level, i.e., in excess of 0.6 negative volt across output terminals 703 and 705. Thus, the unit is disabled if, e.g. leads from terminals 703 and 705 are coupled to wrong polarity battery terminals during a charging operation.

Enable sensor 716 and disable sensor 718 sense the voltage across output terminals 703 and 705, e.g., from a battery, and enables control circuit 712 only if a voltage in excess of a predetermined threshold, e.g., 150 millivolts is present. In this manner, the unit is disabled if the output terminals are disconnected from a battery, to avoid sparks or short-circuits across inadvertent connections.

If desired, a momentary switch S1 can be provided to override the protection features for the purpose of supplying power to a battery that is completely without charge or supplying power to a load with no battery.

Referring now to FIG. 7C, the negative block of rectifier 706 suitably comprises 3 SCR's receptive of control signals from control circuit 712. Control circuit 712 selectively enables SCR's 704 to permit current to flow to the negative pole of the circuitry. Control circuit 712 suitably comprises respective transistors Q1 and Q4, respective resistors R2 and R3, and a momentary contact switch S1. Transistor Q4 is selectively forward biased by the sensing circuitry, as will be explained. In the absence of a sensed reverse polarity, when transistor Q4 is forward biased, Q1 is turned on through divider chain resistors R2 and R3, enabling SCR's 704.

Reverse polarity sensor 714 disables control circuit 712 upon sensing a reverse polarity connection at output terminals 703 and 705. In the preferred embodiment, reverse polarity sensor 714 comprises respective resistors R4, R5, R6 and R11, a diode CR7, and respective transistors Q2 and Q3. A relatively small reverse polarity voltage across terminals 703 and 705, e.g., by virtue of a reverse polarity connection to a battery to be charged, causes diode CR7 to be forward biased. When diode CR7 is forward biased in excess of a predetermined level, e.g., 600 millivolts, a base drive is provided across divider chain R5 and R6, turning on transistor Q3. Transistor Q3 is collector coupled to the base of transistor Q2. When transistor Q3 is turned on, it disables transistor Q2 and, concomitantly, transistor Q1 in control circuit 712 to disable rectifier 706.

Enable sensor 716, in effect, enables control circuit 712 only after terminals 703 and 705 are connected to a battery, to avoid sparking or inadvertent short circuits. Enable sensor 716 suitably comprises a capacitor C2, respective resistors R1, R10 and R16, a diode CR5, and a Zener diode CR4. When diode CR5 is forward biased above predetermined threshold, e.g., 600 millivolts, the voltage is applied to the cathode of Zener diode CR4. When the voltage overcomes the Zener voltage of the diode, voltage is then applied across a voltage divider comprising resistor R10, and resistor R9 in control circuit 712, to provide a bias voltage for transistor Q4 in control circuit 712. This, in turn enables transistor Q1 and, hence, rectifier 706. Should the voltage at terminal 703 drop below 600 millivolts, as would be in the case of a short circuit, transistor Q4 is turned off, turning off transistor Q1, and disabling SCRs CR1, CR2 and CR3 of rectifier 706. Resistor R1 and Capacitor C2 comprise a filter for noise immunity.

Disable sensor (over-voltage sensor) 718 senses a rise in voltage when current flow drops and responsively disables rectifier 706. This effectively disables the high current output when terminals 703 and 705 are disconnected. Disable sensor 718 comprises respective Zener diodes Z1 and Z2, capacitor C1, resistors R7 and R12, and transistor Q5. Zener diode Z2 is selectively switched in and out of the circuit depending upon which of the respective low-voltage, high-current windings has been selected, e.g., the 12- or 24-volts. When voltage is applied across diode CR5 to the cathode of Zener diode Z1 or Z2, the Zener voltages, e.g., 22 volts for Zener Z2 and 18 volts for Zener Z1, is applied across the divider comprising resistors R7 and R12, turning on transistor Q5. This, in turn, disables transistor Q4 and control circuit 712, disabling SCR block 710.

In accordance with another aspect of the present invention, to facilitate a light weight unit, housing 260 serves as both an electrical ground and as a heat sink for various of the circuit components. Referring now to FIGS. 7B, 7C, 4, and 5, the anodes of SCR's 704 of block 710 are connected directly to housing 260. Specifically, the anodes of SCR's 704 are electrically and thermally connected to housing 260, e.g., to wall 422. Negative terminal 705 is electrically and mechanically connected to housing 260, i.e. wall 424 of housing 260, and thus electrically connected through the housing to the anodes of SCR's 704. Terminal 705 suitably includes a post extending through wall 424 (FIGS. 1 and 4). Housing 260 thus serves both as electrical ground and heat sink. The cathodes of positive diodes in block 708 are electrically and thermally connected to heat sink 500 (500A in FIG. 5A) and therefrom to terminal 703. The post of terminal 703 extends through an aperture 502 in wall 424 of housing 260, electrically isolated by insulative washers 504. By employing housing 260 as both electrical ground and a heat sink, the necessity of a separate heat sink for one set of diodes is avoided.

As previously noted, rotor 220 is preferably a permanent magnet rotor of a sufficiently light weight that it can be maintained in axially alignment with, and rotated relative to, stator 210 without the necessity of any bearings in addition to those conventionally included within engine 12. In the preferred embodiment, this is achieved by employing high energy product magnets, and consequence poles. Referring to FIGS. 8A, 8B, 8C and 8D, rotor 220 preferably comprises a generally disc-shaped core 800 bearing a polarity of high energy product magnets 802 to dispose on the circumferential surface thereof. Magnets 802 are preferably disposed within the insets 803 in the circumferential surface, with the intervening portions of core 800 comprising consequence poles 806.

Magnets 802 include an outer face 808, and an inner face 810. (810A in FIG. 8A) Each magnet 802 is disposed within inset 803 with inner surface 810 (810A) seated on a conforming surface 805 (805A) of core 800, offset from the adjacent consequence poles 806 by a pre-determined gap 812.

Magnets 802 preferably comprise high energy product magnets having a flux density of at least on the order of five kilogauss, suitably formed of a rare earth alloy such as neodymium iron boron, or samarium cobalt. Such rare earth materials tend to be extremely expensive, and, accordingly, it is desirable to minimize the amount of material used. However, at the same time, it is desirable to generate relatively high flux densities. In the preferred embodiment, magnets 802 are relatively thin, e.g. on the order of 1/10 of an inch thick, but present a relatively large area, ¾ of an inch by approximately one inch, to minimize the amount of high energy product magnet used.

In accordance with one aspect of the present invention, the overall size of the device, and amount of high energy product magnetic material used, is minimized for a given total flux. Specifically, the area of magnet face 808 is greater than the area of the face 806 of consequence poles by approximately the ratio of the flux density produced by the permanent magnet to the allowed flux density of the consequence pole. Thus, by maximizing the area of the permanent magnet relative to the consequence pole, a smaller diameter core is required for a given total flux. A smaller diameter core results in less weight and less magnetic material being required for a given total flux.

Inner faces 810 (FIG. 8C) and corresponding inset surface 805 of inset 803 are preferably curved along a radius concentric with magnet outer surfaces 808 and the outer surfaces of consequence poles 806. Respective gaps 812 are maintained between each magnet 802 and adjacent consequence pole 806. Gap 812 is preferably significantly larger than air gap 242 (FIG. 2) between rotor and stator, e.g., five or six times greater, to ensure that the majority of magnetic energy is directed into the stator rather than across gap 812.

Magnets 802 are suitably secured to core 800 with glue. If desired, rotor 220 can be wrapped in a non-metallic material, e.g. fiberglass tape, to secure magnets 802 against centrifugal forces generated by rotation.

Magnet inner face 810, 810A and corresponding inset surface 805 and 805A may be any configuration, so long as they conform to each other. For example, referring to FIG. 8D, inner face 810A of magnet 802 and mating surface 805A on core 800, may be planar. In such case, it has been determined that it is desirable to include a notch 814, extending radially below surface 805(a) in the vicinity of magnet consequence pole air gaps 812. Notch 814 has been found to increase the amount of flux directed into the stator from rotor 220.

If desired, generator unit 14 can be modified to generate AC signals. Referring to FIG. 9, a 115 volt AC signal can be provided by: replacing high voltage low current winding 602 with a higher voltage winding 902, e.g. 150 volt winding; replacing three-phase bridge 700 with an analogous circuit 904 rated for the higher voltage; and applying the DC signal to a suitable inverter 906.

Three-phase regulator 904 generates an output voltage on DC rail 905A, 905B at a level, e.g., 150 volts DC, sufficient to generate the desired AC voltage. DC rail 905A, 905B is suitably floating with respect to system ground (i.e. housing 260), to facilitate grounding inverter 906 in accordance with UL standards.

Inverter 906 generates an output signal 915 at outlet 702 that simulates a sine wave of predetermined frequency inverter 906 is preferably a variable frequency inverter, and suitably includes a control section 908 and power conversion section 910. In general, control section 908 generates switching control signals to power conversion section 910, which responsively applies the DC rail voltage to the respective terminals (L1, L2) of outlet 702. The application of the DC rail signals generates an output signal 915 with a predetermined waveform simulating (e.g. having the same RMS value as) the desired AC signal (e.g 120v 60 Hz in the U.S.; 220v 50 Hz in Europe). Stable supply voltages (e.g. 15v, 5v) for inverter control section 910 are suitably derived from control winding 605 by a bridge rectifier 912 and regulator 914.

The use of a variable frequency inverter is particularly advantageous in a number of respects. Since the AC signal is developed synthetically by inverter 906, it is independent of the rpm of engine 12. Accordingly, inverter 906 can be adjusted to provide full power at various predetermined frequencies, e.g., 60 Hertz in the United States, and 50 Hertz in most European countries.

Further, by varying the frequency of the output as a function of load current draw to accommodate extraordinary transient demands from loads, unit 10 is made capable of operating with much larger devices than would typically be the case. Particularly, it has been determined that the current required to start a large motor, such as, for example, the refrigeration compressor on an air conditioner, is much greater than the current required to maintain operation of the motor once it has been started. When the load, e.g. motor, draws a current higher than the rated output of the system, the DC rail voltage applied to inverter 906 tends to drop. It has been determined that by reducing the frequency of the AC output signal as a function of, e.g. proportionately with, the reduction in voltage, unit 10 can be used to start, and maintain in operation, motors that would typically require a much larger generator. Lowering the frequency at the applied signal effectively lowers the operating RPM of the motor, e.g. compressor, to be started. This lowers the load on the motor and therefore decreases the current required to start the motor. The frequency can then be increased, increasing the motor RPM to the designed operating speed. For example, when the voltage drops below a predetermined level, e.g. approximately 110 volts, frequency is decreased, preferably linearly tracking voltage down to about 30 hertz and 50 volts. Once the motor is running, the current drawn by the motor reduces, the DC rail voltage rises, and the normal operating frequency is resumed. For example, 2 kilowatt generator in accordance with the present invention is capable of starting and maintaining a 13,000 btu air conditioner which, previously, in order to accommodate the starting loads, required a 4 or 5 kilowatt generator.

Conversely, since the speed of engine 12 can be lowered without reducing frequency, the speed of engine 12 can be varied as a function of output drawn. Thus if only a fraction of the system capacity is being drawn, the engine can be throttled back or made to idle. More specifically, a voltage feedback control can be employed to govern the speed of the engine. The speed of the engine is thus varied as a function of load, providing decreased noise and increased fuel economy.

Figure 10:
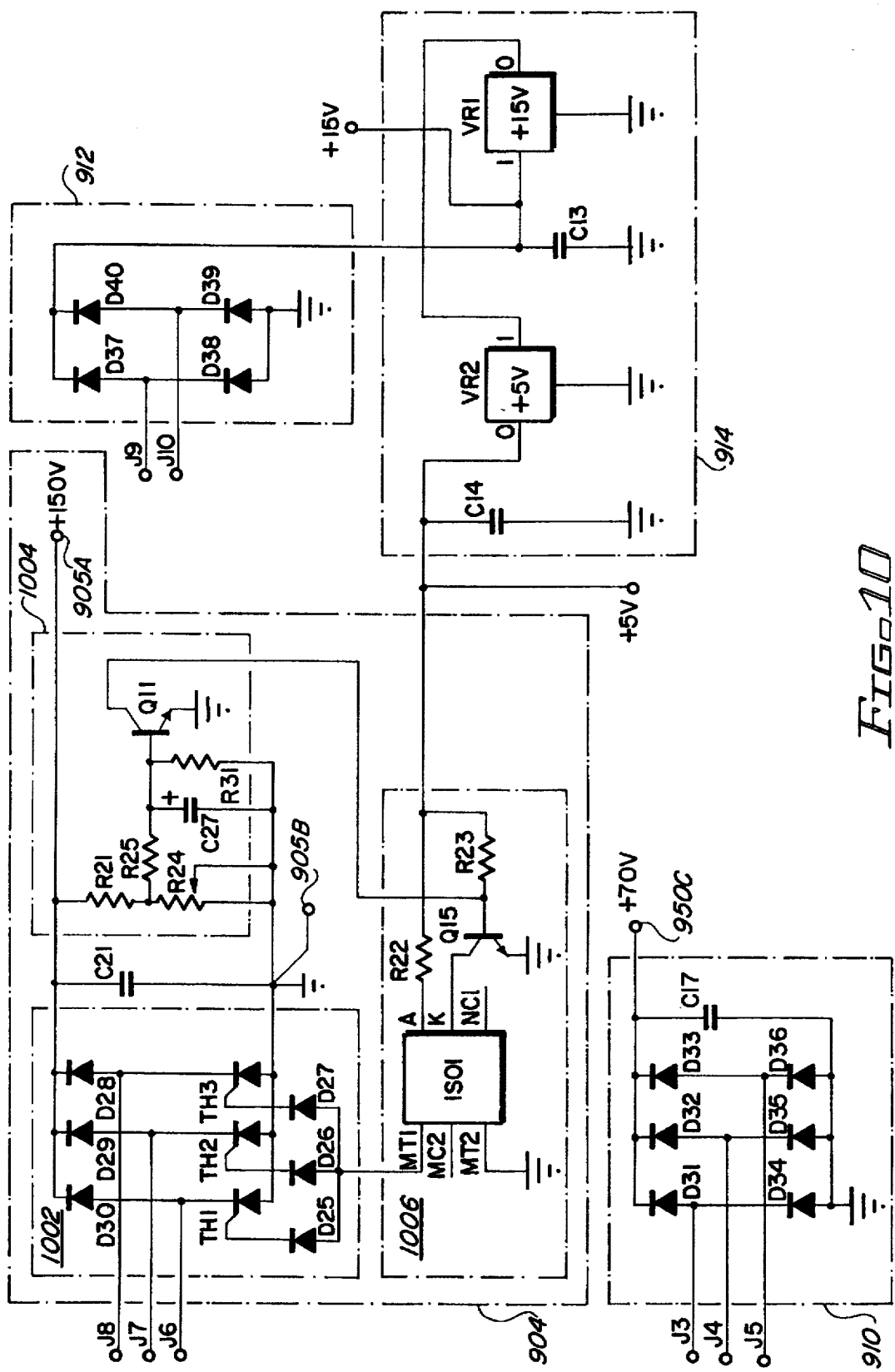
FIG. 10 is a schematic of the three-phase regulator, single phase bridge at signal supply of the circuit FIG. 9.

As previously noted, regulator 904 generates the DC rail signal to inverter 906. Referring to FIG. 10, a suitable regulator 904 comprises: a rectifier bridge 1002; a leveling capacitor C21; a comparator 1004; and an optoisolator 1006. Rectifier bridge 1002 is suitably formed of respective diodes D28, D29 and D30 and respective SCR's TH1, TH2, and TH3. Comparator 1004 suitably comprises respective transistors Q11 and Q15, and a voltage divider formed of resistors R21 and R24.

The output leads (J6, J7, and J8) from 3-phase alternator coil 902 provide 3-phase input signals to bridge 1002. Such alternator output signals are of variable voltage and frequency in accordance with the RPM of the engine. Comparator 1004 selectively activates opto-isolator 1006, to turn on SCR's TH1, TH2, and TH3 to generate a regulated output across DC rails 905A and 905B.

In essence, comparator 1004 provides active feedback to maintain the rail voltage at the predetermined level, e.g., 150 volts. Indicia of the rail voltage is derived, and compared against a reference voltage (a stable regulated DC voltage provided by regulator 914). When the rail drops below the designated voltage, e.g., 150 volts, comparator 1004 activates opto-isolator 1006 to turn on SCRs TH1–TH3.

Stable supply voltages (e.g. 15v, 5v) are suitably derived from control winding 605 by bridge rectifier 912 and regulator 914. Bridge 912 suitably comprises a conventional single phase diode bridge. Regulator 914 suitably comprises respective conventional regulator devices Vr1 and Vr2, such as Motorola 78LXX series pass three lead regulator devices to provide stable, regulated DC outputs at appropriate levels (e.g Vr1 15v, Vr2 5v) for inverter control 908 (15V), SCR's TH1, TH2, and TH3 (5v), and for deriving a stable reference signal for comparator 1004 (5v).

Figure 11:
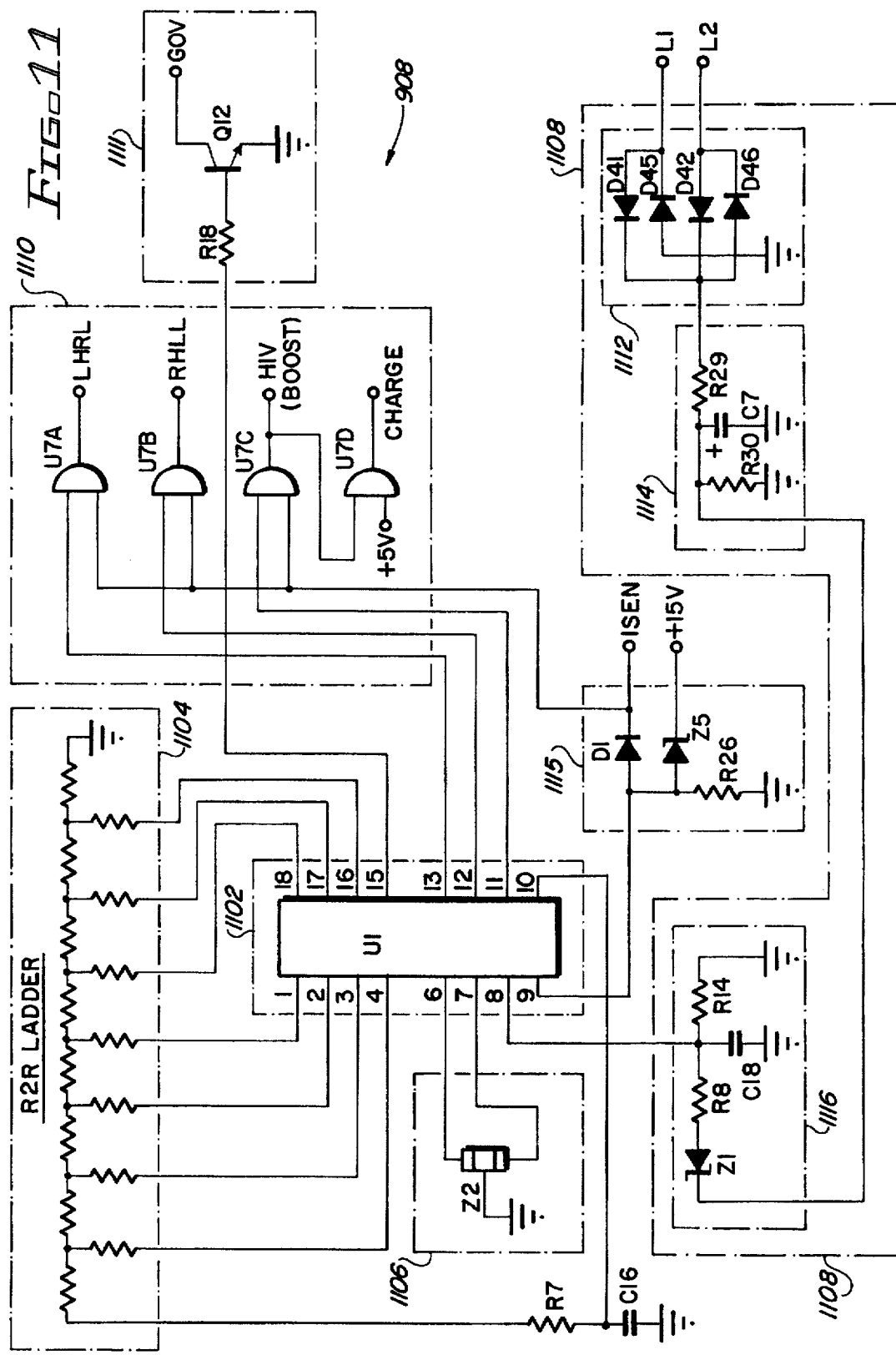
FIG. 11 is a schematic of a suitable inverter control section.

As previously noted, control section 908 generates switching control signals to power conversion section 910. Referring to FIG. 11, inverter control section 908 suitably comprises: a suitable microcomputer 1102; a suitable digital-to-analog ("D to A") converter 1104; a suitable crystal 1106 of predetermined resonant frequency, e.g. 4 megahertz; suitable feedback signal interface circuits 1108 and 1115; and suitable combinatorial logic 1110.

Microcomputer 1102 is suitably a conventional microcomputer, such as, for example, a Ziolog Z86E04, including internal random access memory (RAM), counters and registers (which can be implemented in the RAM in accordance with standard techniques), and additionally, respective internal comparators capable of generating interrupts, and respective port registers for controlling the output signals at various output terminals (pin) with the microcomputer. (For convenience of reference, corresponding port registers will sometimes be referred to synonymously.) More particularly, microcomputer 1102 suitably includes two internal comparators, the first comparing the voltage applied at pin 8 to that applied at pin 10, and the second comparing the voltage applied at pin 9 to the voltage applied at pin 10 (the voltage at pin 10 is a common reference signal). As will be explained, the common reference signal is suitably a controlled ramp voltage generated by D to A converter 1104.

Microcomputer 1102 generates a count (ATOD, FIG. 11A) which is reflected at pins 1–4 and 15–18. D to A converter 1104, suitably an R2R resistor ladder connected to pins 1–4 and 15–18 of microcomputer 1102, generates a ramp reference signal reflecting that count. The voltage across the R2R ladder is filtered and applied as the common comparator reference signal at microcomputer pin 10. As will be described, comparisons of various parameters, (e.g. indicia of output signal 915 voltage (pin 8), indicia of supply voltage or overcurrent condition (pin 9)) against the ramp signal are employed to generate digital indicia of the parameters or specified functions; the instantaneous value of count ATOD when the parameter and reference voltage are equal is indicative of the value of the parameter voltage. The comparisons are also employed to selectively initiate interrupt functions.

Microcomputer 1102 is suitably interrupt driven; various interrupt signals are generated to effect predetermined functions. For example, interrupts are generated in response to: a comparison of the D to A ramp reference signal to the indicia of output signal 915 from interface 1108 (switching cycle frequency adjustments); a comparison of the D to A ramp reference signal to the indicia of output current, current sense signal (ISEN) (overcurrent protection) and indicia of the supply voltage (below power transistor gate threshold protection); and a comparison of counts from an internal clock to respective control parameters (pulsewidth of switching pulses generated at pins 12 and 13 and deadtime between pulses).

In addition, microcomputer 1102 suitably cooperates with combinatorial logic 1110 to generate respective switching signals LHRL (Left High, Right Low) and RHLL (Right High, Left Low) to power conversion section 910, in response to which power conversion section 910 effects controlled application of the DC rail to output terminals L1 and L2. More specifically, microcomputer 1102 generates, at pins 12 and 13, respective alternative pulses of controlled pulsewidth, relative timing, and repetition rate. These pulses are gated with current sense (ISEN) feedback signal, to generate switching signals LHRL and RHLL. Microcomputer 1102 and combinatorial logic 1110, may also generate, if desired, further switching signals HIV (BOOST) and CHARGE, and GOV to power conversion section 910 to effect advantageous shaping of output signal 915. The operation of microcomputer 1102 will be more fully described in conjunction with FIGS. 11A–11F.

Indicia of the voltage of output signal 915, suitable for comparison to the ramp reference signal generated by A to D converter 1104, is provided by feedback signal interface circuit 1108. Feedback signal interface circuit 1108 suitably comprises: a single phase diode bridge 1112 connected to output terminals L1 and L2; a suitable low pass filter circuit 1114 (e.g., resistors R29 and R30, and capacitor C7); a Zener diode Z1; and second low pass filter circuit 1116 (e.g., resistors R8 and R14, and capacitor C18). Output signal 915, as provided at output terminals L1 and L2 is applied to bridge 1112, to generate an average DC signal. The DC signal is filtered, smoothed and limited by filters 1114 and 1116, and Zener diode Z1, and applied to a voltage divider (R8, R14) to generate a signal proportional to the average voltage of output 915. The signal is applied at pin 8 of micro-computer 1102, for comparison against the reference ramp.

Signals indicative of under threshold voltage supply levels and over current conditions are provided by second feedback interface circuit 1115. More specifically, the 15 volt supply voltage generated by regulator VR1 of supply of 914 is applied across a voltage divider formed of Zener diode Z5 and resistor R26 to generate a signal indicative of the supply voltage level. This signal is applied to pin 9 of microcomputer 1102 for comparison against the reference ramp. In addition, a signal (ISEN) indicative of the current level of the output signal generated by power converter 910 is applied through an isolation diode D1 to 1009 of microcomputer 1102. In essence, if the supply voltage level drops below a pre-determined minimum, or the output current exceeds a pre-determined maximum, an interrupt is generated to disable power converter 910, and protect its components from damage.

Figure 12:
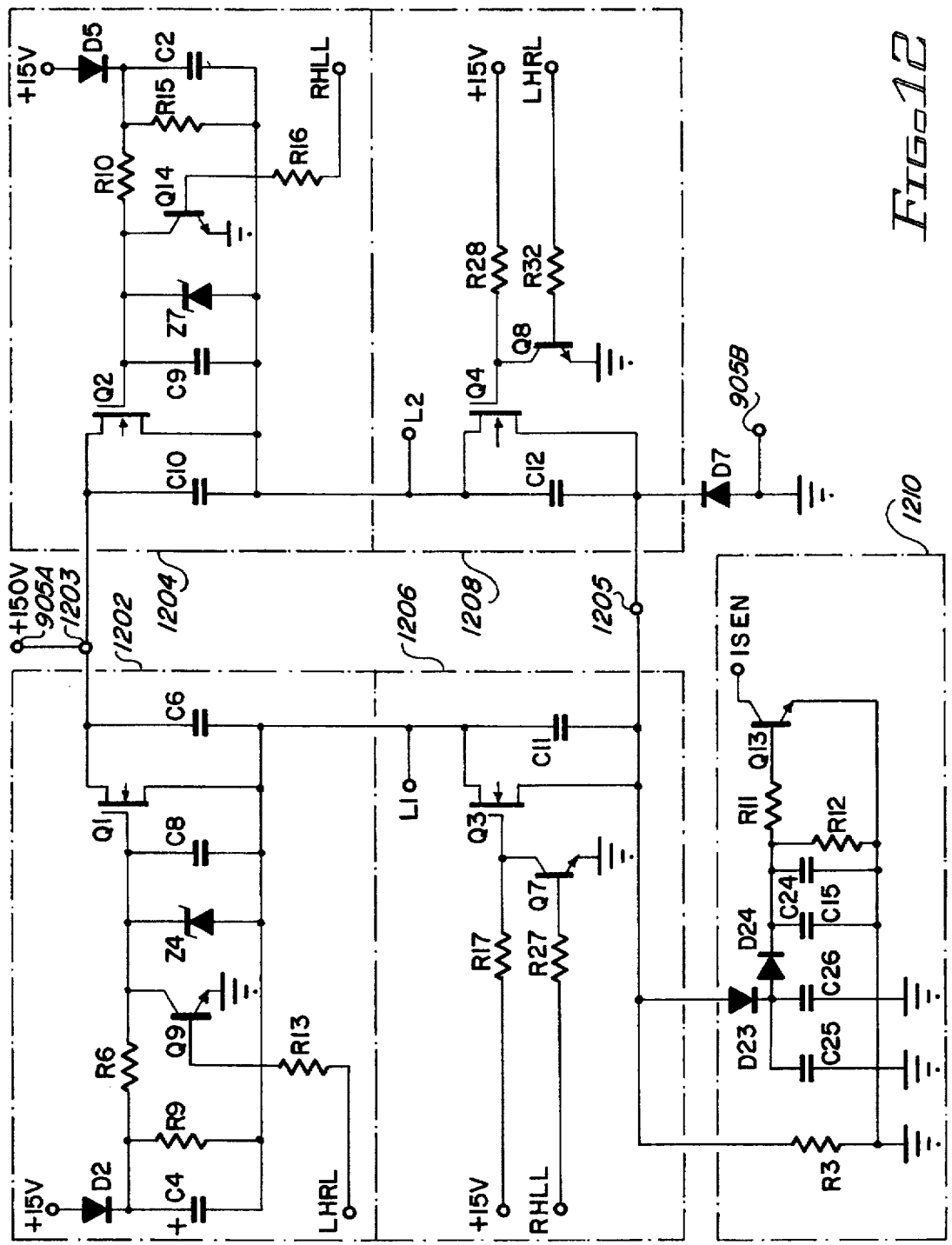
FIG. 12 is a schematic diagram of a basic power converter.
Figure 15:
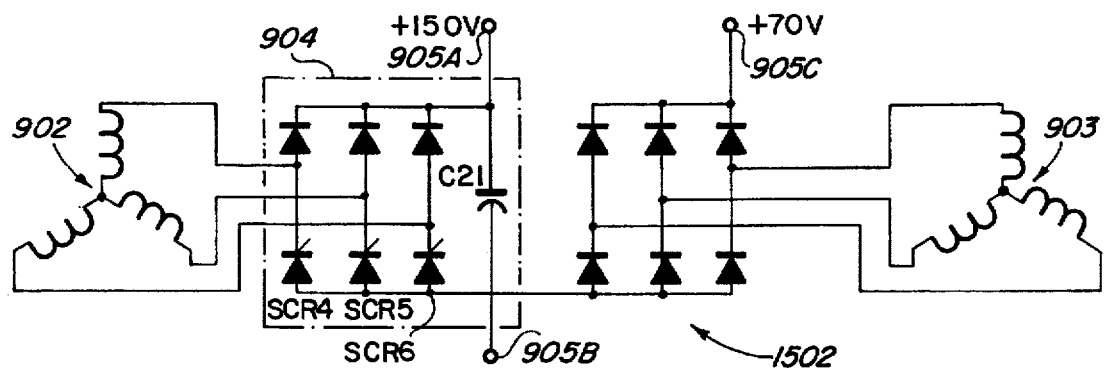

Power conversion section 910, in response to switching control signals LHRL and RHLL, (and further switching signals HIV (BOOST) and CHARGE, if utilized) from control section 908, selectively applies the DC rail voltage to the respective terminals (L1, L2) of outlet 702 to generates an output signal 915 with a predetermined waveform. Referring to FIG. 12, a suitable basic power conversion circuit 910A comprises: respective high-side isolated power switch circuits 1202 and 1204; respective low-side non-isolated power switch circuits 1206 and 1208; and a current sensor amplifier 1210.

High-side isolated power switch circuits 1202 and 1204 and low-side non-isolated power switch circuits 1206 and 1208 each include a power transistor (Q1, Q2, Q3, and Q4, respectively) and a suitable firing circuit for turning the power transistor on and off in accordance with switching signals LHRL and RHLL. Power switch circuits 1202–1208 are interconnected in an H-configuration: High-side isolated power switch circuits 1202 and 1204 define controlled current paths to output terminals L1 and L2, respectively, electrically connected together at a high-side terminal 1203 (e.g. the drains of power transistors Q1 and Q2 are connected at terminal 1203); and low-side non-isolated power switch circuits 1206 and 1208 define controlled current paths to output terminals L1 and L2, respectively, electrically connected together at a low-side terminal 1205 (e.g. the sources of power transistors Q3 and Q4 are connected at terminal 1205). In the basic configuration of FIG. 12, high-side terminal 1203 is connected to positive rail 905A and low-side terminal 1205 is connected, through an isolation diode D7, to negative rail 905B.

Figure 13:
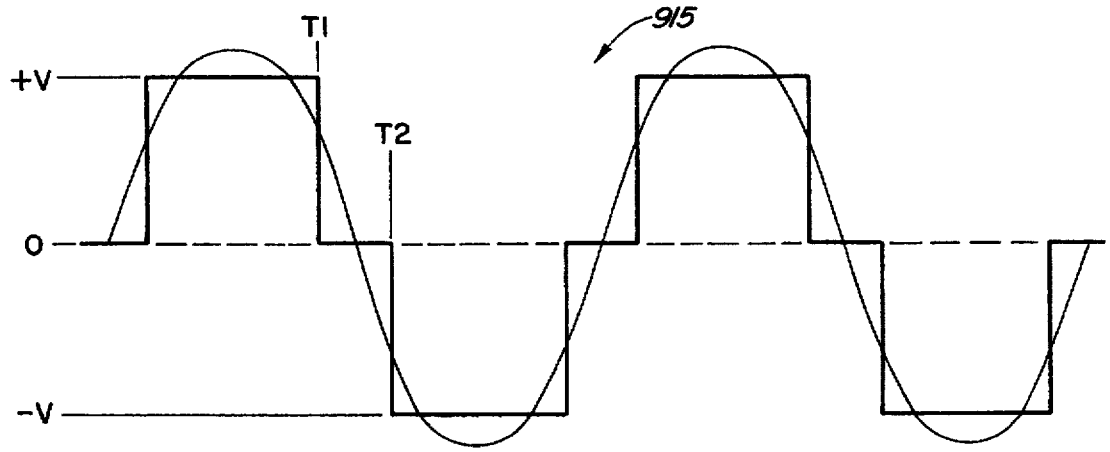
FIG. 13 is a diagram of the output wave form of the inverter of FIG. 9 employing the basic power converter of FIG. 12.

Power switch circuits 1202–1208 effectively operate as an electronically controlled double pole, double throw switch, selectively connecting the DC rail to terminals L1 and L2 in response to switching control signals LHRL and RHLL. More specifically, switching signal LHRL is applied to high-side isolated driver 1202 and low-side non-isolated driver 1208, and switching signal RHLL is applied to high-side isolated driver 1204 and low-side non-isolated driver 1206. When LHRL is of a predetermined state, (e.g. low), high side terminal L1 is connected to positive DC rail 905A by driver 1202, and low side terminal L2 is connected to negative DC rail 905B by driver 1208. Conversely, when RHLL is of a predetermined state, (e.g. low), high side terminal L1 is connected to negative DC rail 905B by driver 1204, and low side terminal L2 is connected to positive DC rail 905A by driver 1206. By alternately generating switching signals LHRL and RHLL, a simulated sine wave, shown in FIG. 13, can be produced, having an RMS value controlled by the period of time ("Dead Time") between turning off one pair of drivers (time T1) and the turning on of the opposing pair (time T2). Control of the dead time in relationship to the voltage levels provides an RMS value approximately equal to that of the desired sine wave.

It is desirable that the firing circuits of isolated drivers 1202 and 1204 quickly switch the associated power transistor Q1, Q2 into a saturated state when the associated switching signal LHRL, RHLL changes state to minimize power dissipation during the switching interval. A particularly economical firing circuit that provides advantageous turn on and turn off characteristics comprises: a resistor R13 (R16); an NPN transistor Q9 (Q14); a diode D2 (D5); a capacitor C4 (C2); and respective resistor R9 (R15) and R6 (R10). If desired, respective capacitors C8 (C10) and C6 (C9) may be connected between the drain and source and gate and source of power transistor Q1 (Q2) to prevent any high frequency oscillations, and a Zener diode Z4 (Z7) connected between the drain and source of power transistor Q1 (Q2) to limit the gate voltage to no more than a predetermined value, e.g. 15v.

In the preferred embodiment control signals LHRL and RHLL are at a low level when actuated and a high level when nonactuated. When the associated control signal LHRL (RHLL) is nonactuated, i.e. high, transistor Q9 (Q14) is rendered conductive. This, in effect, grounds the gate of power transistor Q1 (Q2) and renders it nonconductive. However, a current path is created from the 15 volt supply through diode D2 (D5) and resistor R6 (R10); approximately 15v is thus dropped across resistor R6 (R10). With transistor Q9 (Q14) conductive, capacitor C4 (C2) is effectively in parallel with resistor R6 (R10) and is therefore charged to a level (approximately 15v) somewhat in excess of the threshold gate voltage (e.g. 8v) necessary to place power transistor Q1 (Q2) into saturation.

When the associated control signal LHRL (RHLL) changes to an actuated state, i.e. goes low, transistor Q9 (Q14) is rendered nonconductive. This, in effect, places the gate of power transistor Q1 (Q2) at 15v and renders it conductive. When power transistor Q1 (Q2) is rendered conductive, the device exhibits very little resistance, and the source voltage approaches the voltage of the drain (e.g., 150 volts) the negative terminal of capacitor C4 (C2) thus assumes a voltage approximating the rail voltage (150 volts). Since capacitor C4 (C2) is already charged to approximately 15 volts, the positive side of the capacitor is at a voltage approaching the rail voltage plus the charge voltage, i.e., 165 volts. This, in effect, reverse biases diode D2 (D5), rendering the diode non-conductive and effectively blocking the 15 volts supply. However, since capacitor C4 (C2) is charged to a level above the set saturation threshold gate voltage of power transistor Q1 accordingly, transistor Q1 continues to conduct. The level of the source voltage (15 volts) and the level to which capacitor C4 (C2) is initially charged, is chosen to initially place power transistor Q1 (Q2) into a hard full conduction. However, once diode D2 is blocked, capacitor C4 (C2) begins to discharge through resistor R9 (R15). The time constant of capacitor C4 (C2) and resistor R9 (R15) is chosen such that the charge on capacitor C4 (C2) (hence the gate voltage) approaches (is only slightly above) the threshold value of power transistor Q1 (Q2) at the point in time when the associated control signal LHRL (RHLL) changes state. In those systems where the frequency varies, the time constant is chosen such that the gate voltage is approaching (slightly higher than) the threshold value at the lowest frequency at which the system is intended to operate. When the associated control signal RHRL (RHLL) initially resumes a non-actuated state, i.e., goes high, transistor Q9 (Q14) is again rendered conductive, grounding the gate of, and turning off, power transistor Q1 (Q2) and the cycle is repeated. By discharging capacitor C4 (C2) to a point approaching the threshold voltage (eliminating excess charge), the turn off speed of power transistor Q1 (Q2) is increased.

The feedback signal indicative of output current level (ISEN) provided to feedback interface circuit 1115, is generated by current sensing amplifier 1210. Amplifier 1210 simply comprises a resistor R3, and an amplifier comprising transistor Q13. Resistor R3 develops a voltage indicative of the current through power transistors Q1–Q4 if the voltage across resistor R3 exceeds a predetermined limit, transistor Q13 is rendered conductive effectively pulling the ISEN signal to ground. As previously noted, the ISEN signal is applied as a gating control to combinatorial logic 1110 (hand gates U7A, U7B, and U7C; FIG. 11) effectively inhibiting those gates. In addition, it effectively pulls the voltage at pin 9 of microcomputer 1102 to zero, effecting generation of an interrupt, as will be discussed.

Figure 14:
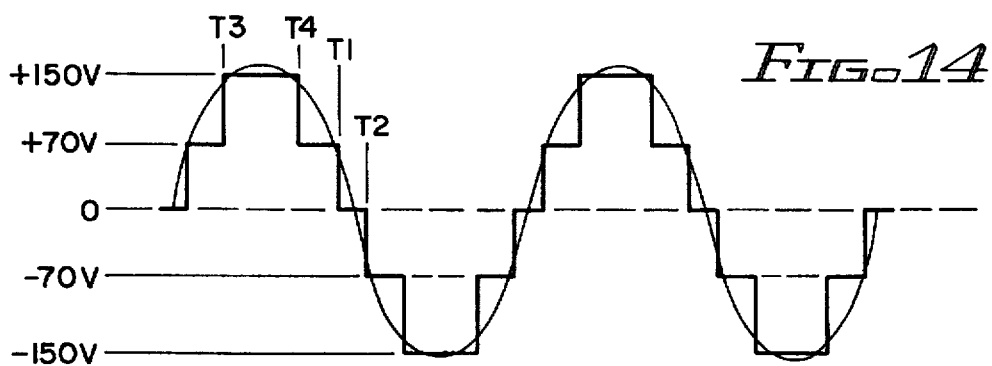
FIG. 14 is an output wave form closely simulating a sine wave.
Figure 11F:
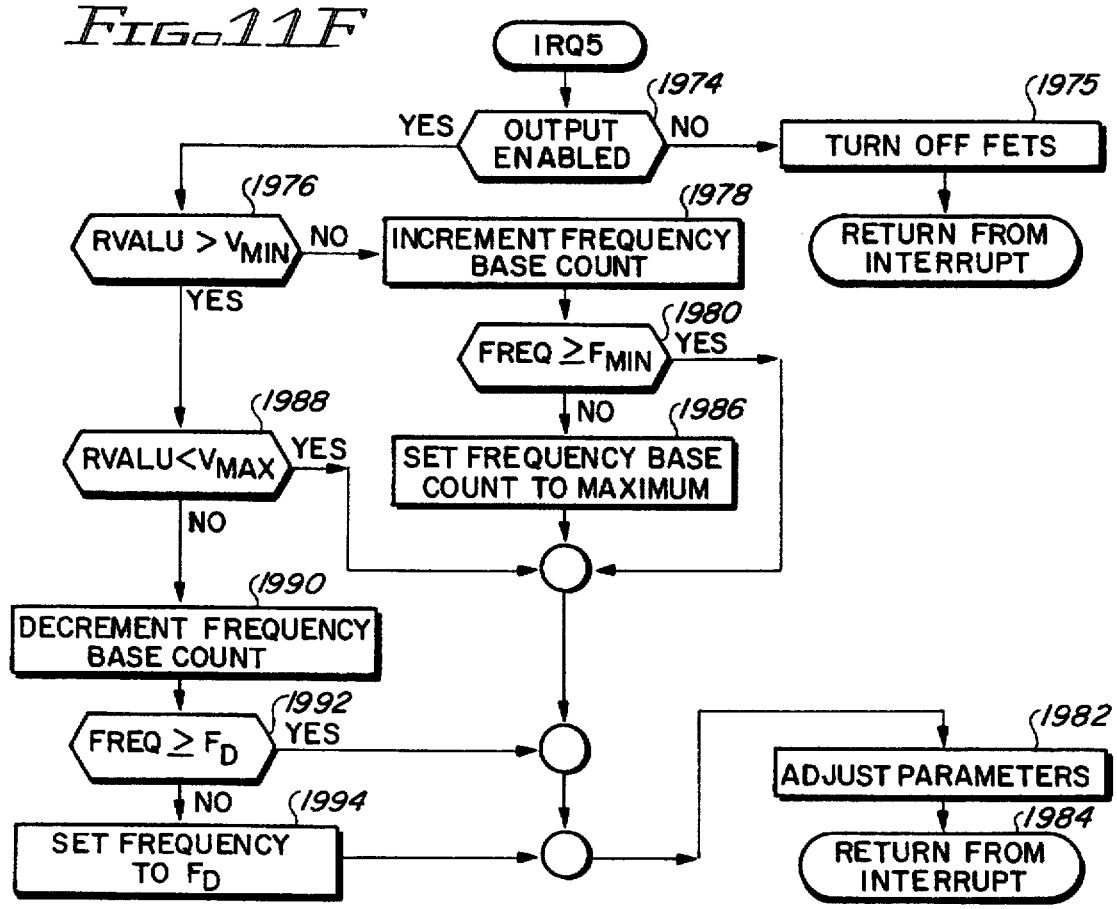

A closer approximation to a desired sine wave output can be achieved by shaping the waveform of output signal 915. This may be accomplished by generating an auxiliary signal and controllably applying it through the activated high side power transistor to the associated output terminal. The resultant waveform is shown in FIG. 14.

An auxiliary (boost) signal can be generated in any number of ways. For example, the boost signal can be generated by an auxiliary winding added in stator 210. Referring to FIGS. 14, 15, 15A, and 16, an additional winding 903 may be wound on stator 210 concurrently with winding 902, in essentially the same space. Winding 903 cooperates with a conventional three-phase diode bridge 1502 to generate an intermediate positive rail 905C of predetermined voltage (e.g., 70v). To generate the simulated sign wave waveform of FIG. 14, the active terminal (L1, L2) is effectively connected to intermediate positive rail 905c, and positive rail 905a, in sequence.

Figure 15A:
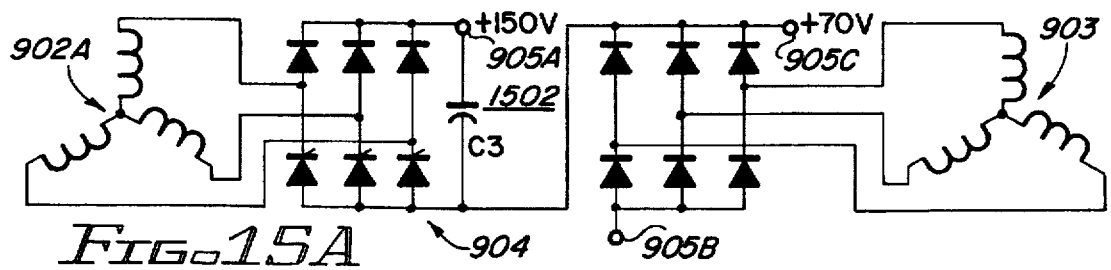
FIGS. 15 and 15A are schematics of alternative auxiliary coil circuits utilized in generating the wave form of FIG. 14.

The intermediate rail voltage can be alternative to the positive rail voltage provided by winding 902, or it can be additive. For example, referring to FIG. 15, the intermediate positive rail and positive rail voltages can be independently developed, e.g., winding 903 generates the intermediate rail voltage, and winding 902 generates the entirety of the positive rail voltage, substantially independently from winding 903. If desired, however, windings 903 and 902 can be utilized to cooperatively generate the desired voltage at positive rail 905a. Referring briefly to FIG. 15A, in such an arrangement winding 903 would include a predetermined number of windings corresponding to the desired voltage and intermediate rail 905c, and diode bridge 1502 would be interposed between regulator 904 and negative rail 905B. A winding 902A, corresponding to winding 902, but including a predetermined number of turns corresponding to the difference between the desired voltage at intermediate rail 905c and the voltage, e.g., 150 volts, at positive rail 905a is provided.

Figure 16:
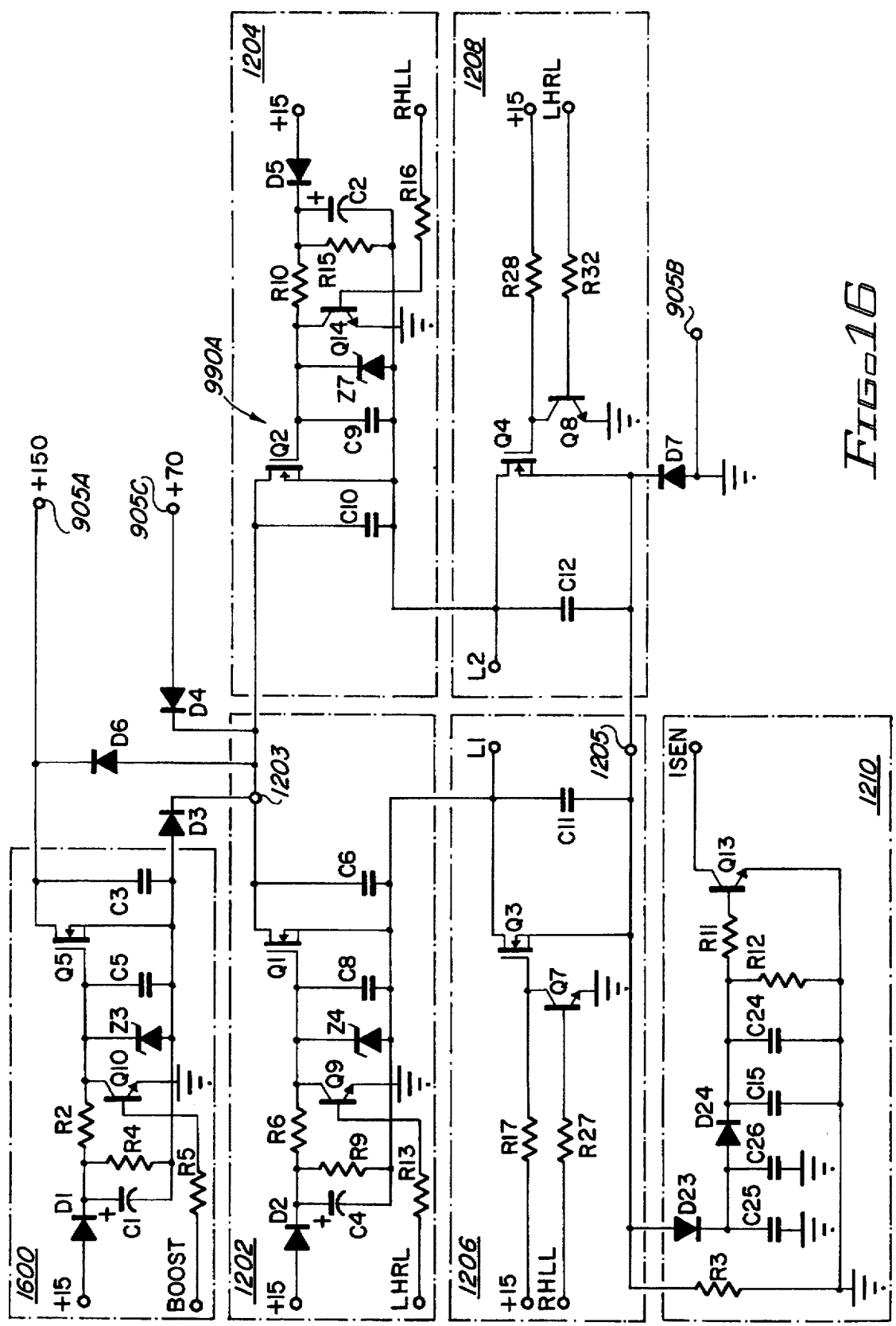
FIG. 16 is a schematic diagram of a power conversion circuit suitable for generating the wave form of FIG. 14.

Referring to FIG. 16, the intermediate voltage (70v) rail 905c is connected to high side terminal 1203 of basic power converter 910A (i.e., to the drains of power transistors (FET's) Q1 and Q2 in high side isolated power switches 1202 and 1204), through a suitable isolation diode D4. The high voltage (e.g. 150v) positive rail is selectively coupled to high side terminal 1203 of basic power conversion circuit 910A through a booster circuit 1600. Booster circuit 1600 is substantially identical to high side isolated power switching circuits 1202 and 1204, including an FET Q5, and an associated firing circuit. Booster circuit 1600, however, is responsive to control signal HIV (BOOST) from control section 908 (from NAND gate U7C in FIG. 11, corresponding to the signal at pin 11 of microcomputer 1102). The drain of booster circuit FET Q5 is connected to high voltage positive rail 905A. The source of the power transistor is connected through an isolation diode D3 to the drains of the power transistors Q1 and Q2 in high side power switching circuits 1202 and 1204. A reverse polarity flyback diode D6 may be provided if desired.

The auxiliary (BOOST) voltage can also be generated without the addition of an auxiliary winding from, for example, the energy generated during the output signal dead time. This is accomplished by, an in effect, storing the energy generated during the output signal dead time (which otherwise would be wasted) in a capacitor, and controllably discharging the capacitor to generate the booster pulse. Specifically, referring briefly to FIG. 11, a separate control signal (CHARGE) inverted from the HIV (BOOST) control signal, i.e., is active during those periods from the trailing edge of a booster pulse (T3) to the leading edge of the booster pulse in the next successive half-cycle. The CHARGE signal is applied to a controlled storage/discharge circuit 1710 which effects charging and discharging of a capacitor to generate the booster pulse. Circuit 1710 suitably comprises an NPN transistor Q16, an FET Q6 and a capacitor C19. The CHARGE control signal is applied to the base of transistor Q16. When the charge signal is activated (e.g., low), FET Q6 is rendered conductive, effectively connecting capacitor C19 to positive rail 905C. (The use of the dead time energy to generate the booster pulse permits a lower rail voltage to be employed.) When the HIV (BOOST) control signal is actuated and hence control signal CHARGE de-actuated, FET Q6 is rendered non-conductive, and capacitor C19 additively discharges to the high side terminal 1203 of basic power convertor 910A to provide the boost pulse.

As previously mentioned, microcomputer 1102 generates a count (pins 1–4 and 15–18) from which the ramp reference signal is generated by D to A converter 1104 and generates switching pulses (pins 11–13) to combinatorial logic 1110 from which the switching control signals to power conversion section 910 are derived (to control application of the DC rail to output terminals L1 and L2 by power conversion section 910). The switching cycle frequency is adjusted in accordance with a comparison of the indicia of output signal 915 from interface 1108 (pin 8) to the reference ramp (pin 10); and the pulsewidth of switching pulses and deadtime between pulses) adjusted in accordance with a comparison of counts from an internal clock to respective control parameters. Power conversion is disabled in response to overcurrent or inadequate supply voltage conditions reflected at pin 9.

More specifically, referring to FIGS. 11 and 11A, microcomputer 1102 maintains a number of internal registers and counters: an analog to digital count (ATOD); respective internal timers, timer 1 and timer 2; a cycle COUNT (COUNT); respective registers (RVALU and GVALU) for storing indicia of the output voltage, and gate voltage (supply voltage), respectively; a count indicative of a half cycle of the output frequency (CPS); a count indicative of the trailing edge (T1 on FIG. 14) of the switching pulses (PWM); a count (BASE) indicative of the time base of the output frequency; an FET output enable flag (DUMMY); and a register (FETMASK) indicative of the switch pulse output pattern desired at pins 11–13; interrupt enable register (INIT) having a bit corresponding to each interrupt; and respective port register P0 and P2 corresponding to pins 11–13 and pins 1–4 and 15–18 respectively. In addition, where a stepped output signal is employed, counts indicative of the leading edge (TB) of the step (FIRST) and trailing edge (T4) (SECND) of the step, steps are also defined. If desired, the processor may also include an interrupt priority register to designate the relative priorities of the respective interrupts.

Referring to FIGS. 11 and 11A–11F, microcomputer 1102 suitably effects a these operations through a continuous primary loop (simple racetrack) program with a predetermined number, e.g., four of interrupt driven subprograms.

The basic loop program implements the operation of D to A converter 1104. The various other functions are interrupt driven.

Figure 11B:
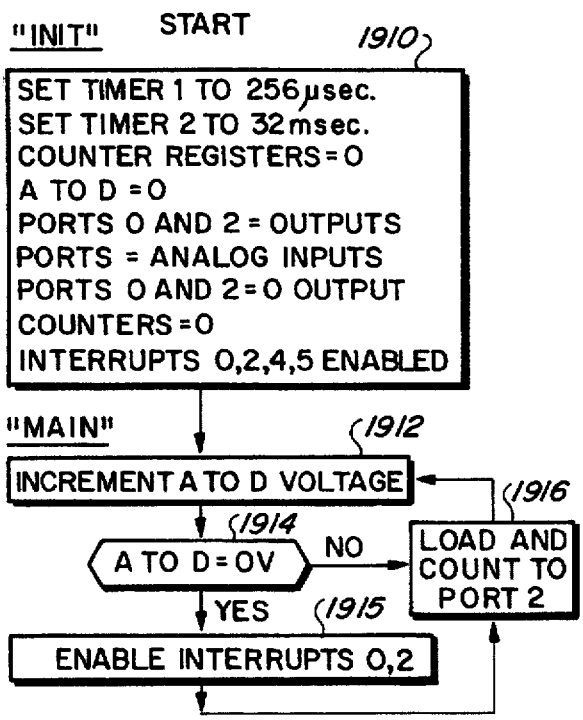

Referring now to FIG. 11B, when power is first applied to microcomputer 1102, the various timers, registers, and ports are initialized (step 11). After initialization, microcomputer 1102 suitably effects a continuous primary loop implementing the operation of D to A converter 1104, and generation of the reference ramp. D to A converter 1104 in effect, generates a controlled ramp voltage from 0 to 5 volts. More specifically, A to D count ATOD, is incremented (step 1912), and then tested to determine whether a rollover has occurred; count ATOD suitably runs from zero to 256, then rolls over to zero (step 1914). Assuming a rollover has not occurred, the ATOD count is loaded to the port P2 corresponding to pins 1–4 and 15–18 (connected to ATOD converter 1904) (step 1916), and ATOD is again incremented (step 1912 repeated). If a rollover occurs, the contents of interrupt enable register INIT is modified to enable respective interrupts (step 1918): interrupt IRQ0 (the over-current/insufficient supply voltage interrupt and interrupt IRQ2 (the output voltage interrupt). As will be explained, overcurrent interrupt IRQ0 and output voltage interrupt IRQ2 are permitted to occur only once per ramp cycle to avoid spurious readings.

Figure 11C:
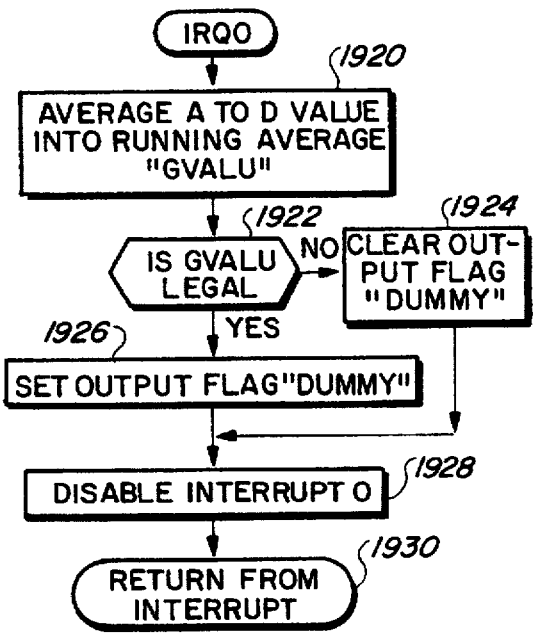

The insufficient supply voltage level and over current protection function is initiated by interrupt IRQ0. IRQ0 is generated when the voltage at pin 9 (supply voltage/FET gate voltage and ISEN over current signal) is equal to the reference ramp. Except in over current conditions (when ISEN drives pin 9 to ground, i.e., 0 volts), the count is indicative of the supply voltage (e.g., nominally 15 volts) applied to the gates of FET's Q1–Q4 of power converter 910. Referring to FIG. 11C, when interrupt IRQ0 is generated, the value of count ATOD is averaged with the contents of register GVALU, and the average loaded into register GVALU to maintain indicia of the running average of the supply voltage level (step 1920). A determination is then made as to whether or not the GVALU is within legal limits, e.g., the supply voltage is at least equal to the minimum logic high voltage seen by the power transistor gates (step 1922).

Depending upon whether or not the content of GVALU is within legal limits, the FET enable flag (DUMMY) is either cleared, to disable power converter 910 (step 1924) or set to enable power convertor 910 (step 1926). The content of interrupt enable register (INIT) is then adjusted to disable interrupt IRQ0 (Step 1928) and a return from the interrupt is effected (step 1930). (As previously noted, interrupt enable register INIT is set to re-enable interrupt IRQ0 at the beginning of the next ramp cycle (step 1918).

Figure 11D:
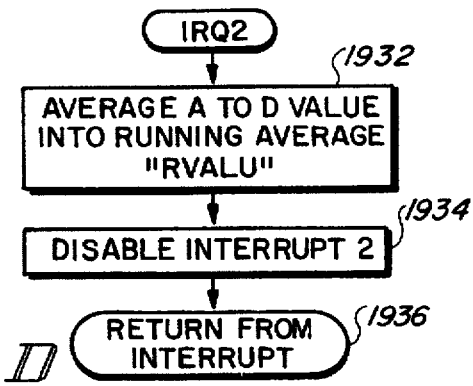

A measurement of the average rectified output voltage is effected in response to interrupt IRQ2, generated each time that the reference ramp exceeds the indicia of output voltage provided at pin of microcomputer 1102. Referring to FIG. 11D, when interrupt IRQ2 is generated, the ATOD count (ATOD) is added into register RVALU, and the sum divided by two, to generate in register RVALU, a count indicative of the running average of the output voltage (step 1932). The input enable register (INIT) is adjusted to disable IRQ2 for the remainder of the ramp cycle (step 1934); interrupt IRQ2 is re-enabled at the beginning of the next ramp cycle (step 1918). A return from the interrupt is then effected (Step 1936).

Figure 11E:
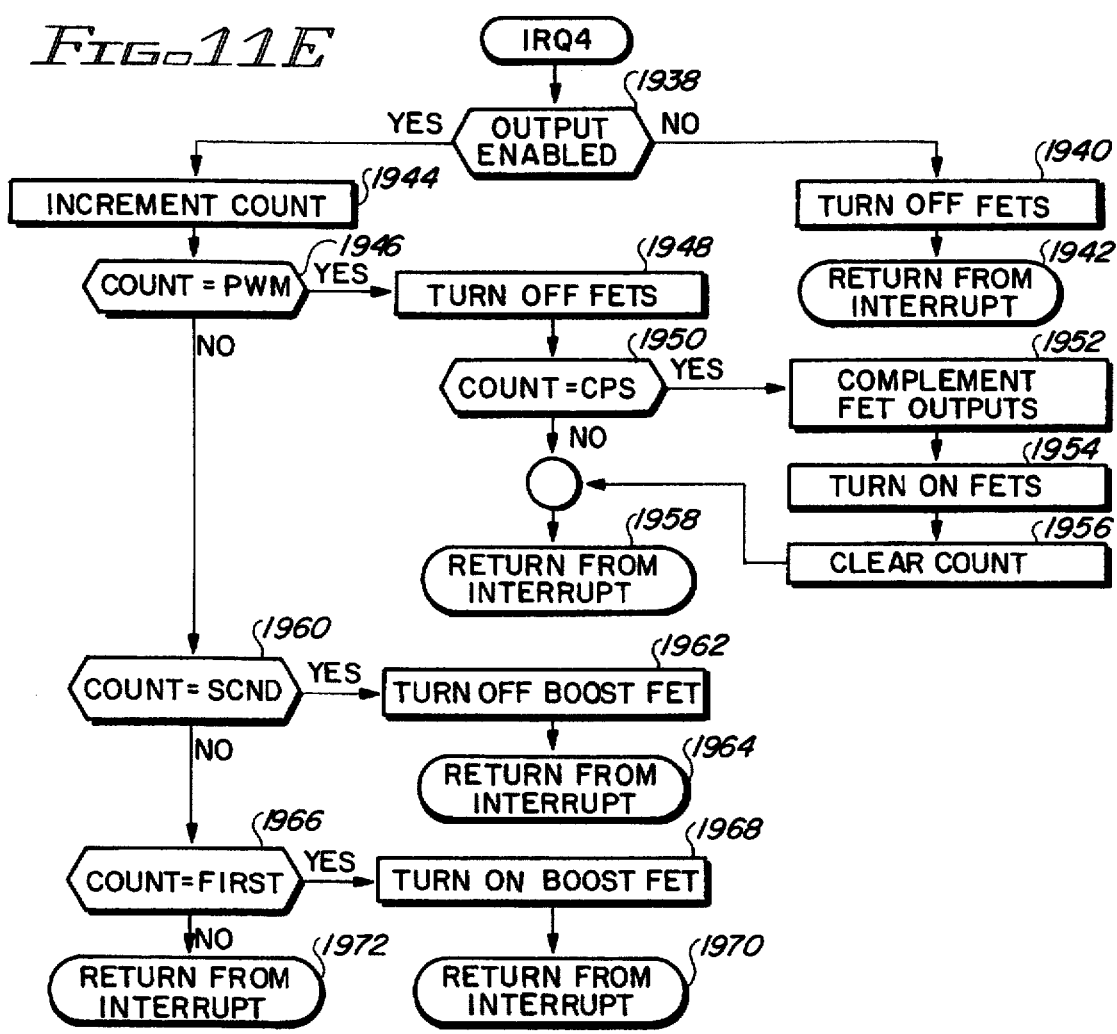

The state of the switching signals generated at pins 11–13 of microcomputer 1102 is controlled by varying the content of switch control output register (FETMASK). The FET state is varied on a periodic basis in accordance with the pre-determined frequency reflected by the contents of the first interval timer, timer 1. For example, for an output frequency of 60 hertz, an interrupt IRQ4 is generated, e.g., every 8.2 milliseconds. Referring to FIG. 11E, when timers 1 interrupt, IRQ4, is generated, FET output enable flag (DUMMY) is tested (step 1938). If the flag indicates that the FETs have been disabled, e.g., because of an over current or supply voltage deficiency condition, switch control output register FETMASK is cleared, to turn off (disable) the FETs of power converter 910 (step 1940), and a return from interrupt is effected (step 1942).

Assuming that the FETs are not disabled, the cycle COUNT (COUNT) is incremented (step 1944) then tested against respective parameters to determine, and set the appropriate state of the power convertor FETs. The cycle COUNT is initially tested against count PWM (step 1946) indicative of the trailing edge of the switch pulse (T1 in FIG. 13). If the cycle COUNT has reached pulse width count PWM, FETs Q1–Q4 in power converter 910 are turned off, e.g., the port register (PO corresponding to pins 11 through 13 is cleared) (step 1948).

The cycle COUNT is then tested against count (CPS) indicative of one-half cycle of the output signal frequency (step 1950). If the cycle COUNT has reached half-cycle COUNT CPS, the status of the respective pairs of FETs in power converter 910, i.e., LHRL and RHLL, are reversed (the bits in switch control output register FETMASK are complimented) (step 1952), and the contents of FETMASK loaded into port register PO corresponding to pins 11 through 13 (step 1954). The cycle COUNT is then cleared (step 1956), and a return from interrupt effected (step 1958). If the cycle COUNT is less than the half-cycle parameter CPS, a return from interrupt is effected (step 1958).

Figure 17:
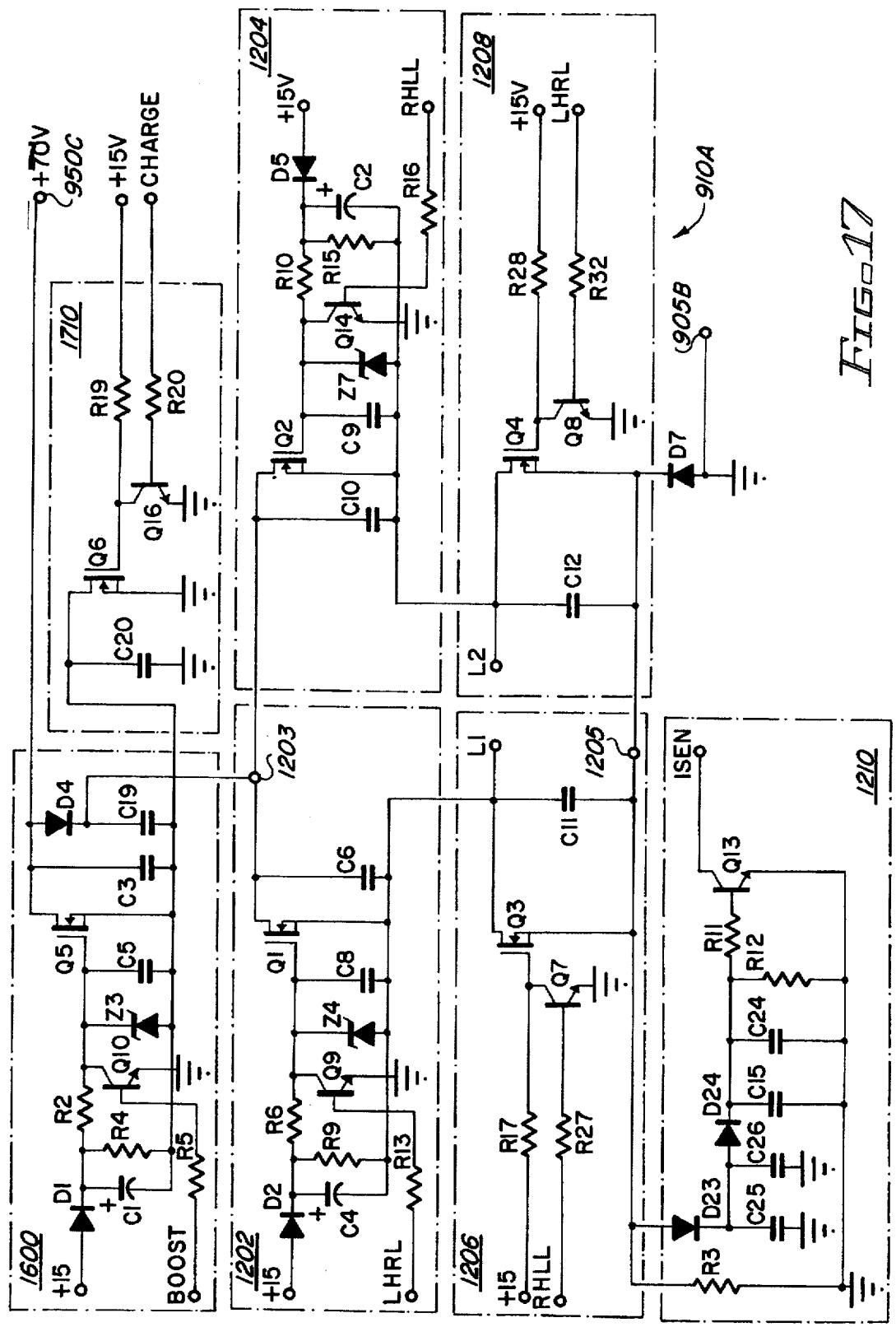
FIG. 17 is a schematic of an alternative power conversion circuit for generating the wave form of FIG. 14.

If the system is employing the basic power converter 910 FIG. 12, and the cycle COUNT is found to be less than the pulse width parameter PWM, a return from interrupt is effected. If however, a closer simulation of the sine wave is intended, i.e., plural steps are provided in the output signal such as illustrated in FIG. 14, e.g., power conversion circuits of FIGS. 16 or 17 are employed, and the cycle COUNT is tested against the edges of the high voltage pulse to control generation of the switching signal at pin 11 from which the HIV (BOOST) and CHARGE control signals generated. Specifically, the cycle COUNT is initially tested against count SECND corresponding to the trailing SECND edge of the high voltage pulse (T4 in FIG. 14) (step 1960) if the cycle COUNT is greater or equal to trailing edge count SECND, the corresponding booster circuit is effectively disabled, e.g., the bit in port register PO corresponding to pin 11 is cleared (step 1962) and a return from interrupt effected (step 1964).

If the cycle COUNT is less than trailing count SECND, the cycle COUNT is then tested against the count corresponding to the leading edge (T3 in FIG. 14) of the high voltage pulse (step 1956).

If the cycle COUNT (already determined to be less than at corresponding to trailing edge T4) is greater than or equal to the count (FIRST) corresponding to the leading edge of a high voltage pulse, booster circuit 1600 is enabled, e.g., the bit in port register PO corresponding to pin 11 is set (step 1968) and a return from interrupt effected (step 1970).

If the cycle COUNT is less than the count corresponding to the leading edge of the booster pulse, a return from interrupt is effected (step 1972). Additional steps are employed in the output signal, intervening tests of the cycle COUNT against the trailing and leading edges of those pulses would suitably be effected between the test against the first step pulse trailing edge (step 1960) and first step pulse leading edge (step 1966).

The frequency, and other parameters of the output signal are adjusted in accordance with the measured values of output voltage on a periodic basis, suitably every two cycles of the nominal output frequency, e.g., 32.256 milliseconds, (approximately 32.32 milliseconds for 60 hertz). In essence, the frequency pulse width and dead time parameters (the time difference between trailing edge T1 and half-cycle time T2) are varied to accommodate transient heavy loads (i.e., motor start-up). In essence, if the output voltage falls below a pre-determined minimum, the frequency is decreased and output wave shape parameters adjusted to provide additional power to the load. Upon generation of periodic interrupt IRQ5, FET output enable flag (DUMMY) is tested (step 1974). If the output is not enabled, the FETs are turned off during (step 1975) and a return from interrupt effected.

Assuming that the FET output is enabled, the output voltage indicia RVALU is tested against a pre-determined minimum value corresponding to the voltage determined to be unacceptably low, e.g., 108 volts AC (the UL low voltage figure—step 1976). If the output voltage is less than or equal to the minimum voltage, it is assumed that the unit is encountering an extra-ordinary load, e.g., a compressor motor under start-up conditions. Accordingly, the frequency of the output signal is incrementally decreased down to a pre-determined minimum value (e.g., 30 hertz), and output waveform parameter varied accordingly to maximize current to the load.

More specifically, a count indicative of the time base for the designated output frequency (during initialization to a count (e.g., 4) corresponding to the desired output frequency, e.g., 60 hertz), is incremented by one (step 1978) to effectively decrease the output frequency. The frequency is checked against the predetermined minimum value, (e.g., 30 hertz) and assuming that the frequency is within the acceptable range, the pulse width and dead time are adjusted to reflect the change in frequency, e.g., are adjusted so that ratios are maintained (step 1982). For example, the count (FIRST) corresponding to the leading edge of the high voltage pulse is set equal to the adjusted BASE count; the count (SECND) corresponding to the trailing edge of the high voltage pulse is then set to five times the leading edge count (FIRST); the count in (PWM) corresponding to the trailing edge (T1) of the pedestal pulse is set equal to seven times the BASE count and, the count (CPS) corresponding to the half-cycle is set equal to eight times the adjusted BASE count. After the output wave form parameters are adjusted (step 1982), a return from interrupt is effected (step 1984).

As noted above, minimum frequency (e.g., 30 hertz) is established. Accordingly, if implementing the BASE count would cause the frequency to drop below the minimum, the BASE count is reset to the count corresponding to that minimum (step 1986) prior to effecting adjustment of the output wave form parameters (step 1982).

Once the extra-ordinary load condition abates, i.e., the inertia of start-up is overcome, an increase in output voltage will be manifested due to the change in output frequency and waveshape. Abatement is assumed once the measured value RVALU reaches a predetermined value (e.g., 122 volts). Accordingly, assuming that the measured value of output voltage RVALU is greater than the minimum voltage (e.g., 108 volts) the measured output voltage (RVALU) is tested against the pre-determined maximum voltage deemed to indicate recovery from the extra-ordinary load condition (e.g., 122 volts) (step 1988). The frequency is then increased on incremental basis until it is brought up to the desired output frequency (e.g., 60 hertz).

More specifically, if the measured output value is greater than the pre-determined minimum (e.g., 108 volts), and less than the pre-determined maximum (recovery) voltage, a return from interrupt (step 1984) is effected. (Adjust parameters step 1982 is effected, but since the BASE count is not adjusted, the values do not change.)

If, however, the measured value is greater than the pre-determined maximum (recovery) voltage (e.g., 122 volts), the frequency BASE count (BASE) is decremented (step 1990), effectively increasing the output frequency. The frequency is then tested against the desired frequency, i.e., the BASE count is tested against a count corresponding to the desired frequency (e.g., 60 hertz) (step 1992). Assuming that the frequency is within range, the output wave form parameters are adjusted to account for the change in frequency (step 1982) and a return from interrupt effected (step 1984). If decrementing causes the BASE count to correspond to a frequency greater than a desired frequency, the BASE count is set to that corresponding to the desired frequency (step 1994) prior to effecting the adjusting parameters (step 1982).

Figure 18A:
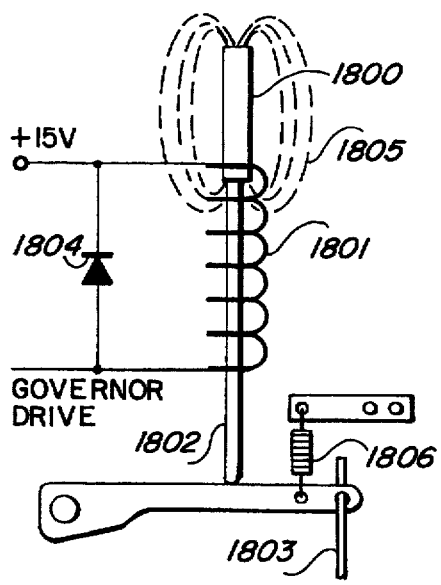
FIGS. 18A and 18B are schematic illustrations of a throttle control in respective states.
Figure 18B:
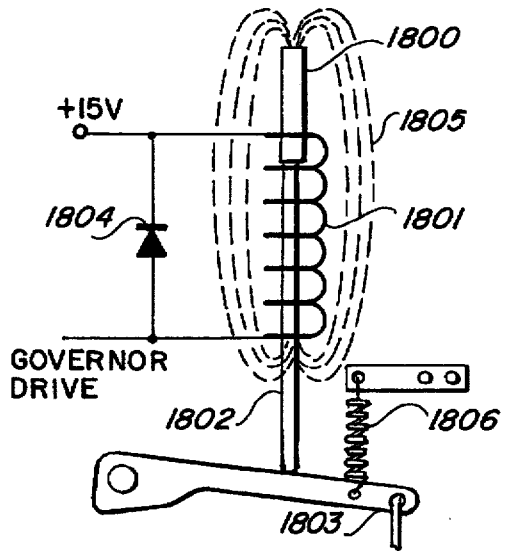

As previously noted, since the speed of engine 12 can be lowered without reducing AC output frequency, engine 12 can be throttled back, or made to idle under circumstances where if only a fraction of the system capacity is being drawn. Referring briefly to FIG. 11, microcomputer 1102 suitably generates at pin 15 a control signal for a load demand governor. When the signal at pin 15 is high, transistor Q12 is rendered conductive, actuating an electromagnetic governor cooperating with the throttle of engine 12. Referring to FIGS. 18A and 18B throttle control signal GOV is suitably generated, as a function of the average load output voltage (e.g., RVALU). In steady state (FIG. 18A), the engine is suitably throttled back. However, when the output voltage decreases to the pre-determined value, the governor signal is generated to throttle-up, and increase the RPM of engine 12. A particularly advantageous load demand governor control comprises a cylindrical magnet 1800, magnetized through the length, suitably formed of Alnico, cooperating with a non-magnetic push rod 1802, for example, formed of nylon, and a winding 1801 wound around a suitable core, e.g., formed of cast nylon. Push rod 1802 cooperates with throttle lever arm 1803. A spring 1806 biases throttle arm 1803 into an idle position.

When the signal at pin 15 is generated, and transistor Q12 rendered conductive, a current path is formed through winding 1801 causing magnetic interaction with cylindrical magnet 1800. The magnetic interaction between coil 1801 and magnet 1800, causes magnet 1800 to move forward (FIG. 18B) against the bias of spring 1806, throttling up (increasing the RPM) of engine 12.

The control signal generated at pin 15 of microcomputer 1102 is suitably pulse-width modulated. The wider the pulse width, the more power to coil 1801, and concomitantly, the greater the movement of magnet 18, push rod 1802, and throttle arm 1803. If desired, a fly-back diode 1804 can be provided across coil 1801.

Figure 19A:
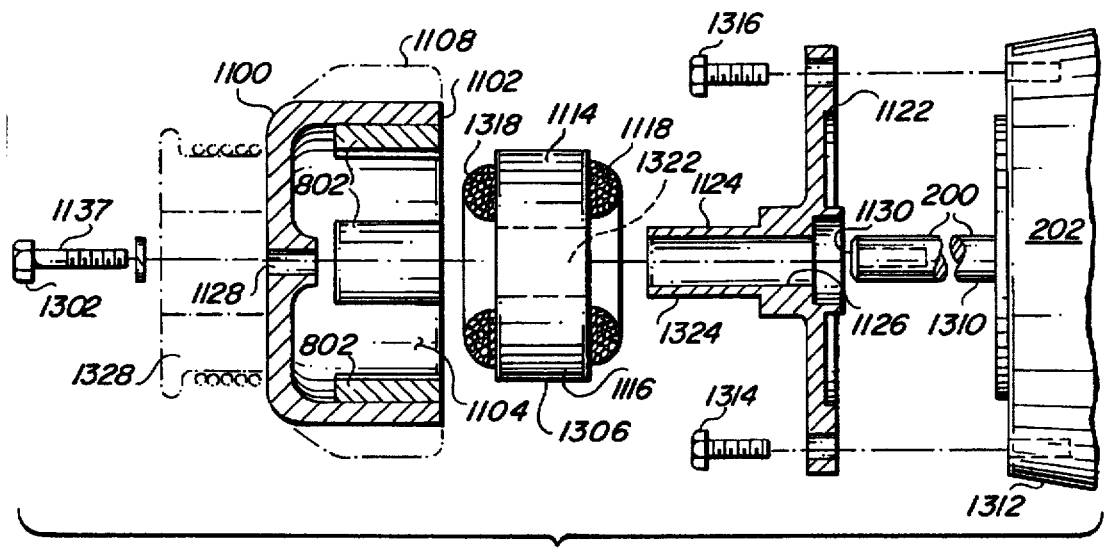
FIGS. 19A and 19B are an exploded side sectional view of an alternative generator assembly using an external rotor, and a top view of the external rotor, respectively.
Figure 19B:
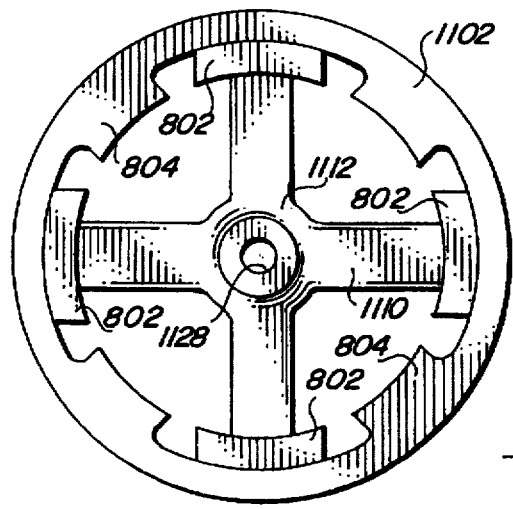

In some instances, weight and size advantages can be obtained by employing an external rotor disposed to rotate around the perimeter of an internally disposed stator. Referring to FIGS. 19(a) and 19(b) an external rotor suitably 1100 comprises a cylindrical casing 1102 formed of soft magnetic material, having an internal cavity 1104. Alternating permanent magnets 802 and consequence poles 1106 are disposed in the interior side wall of casing 1102. If desired, respective fins (fan blades) 1108 can be formed on the exterior side walls of cup 1102, to facilitate cooling. Likewise, the top of cup 1102 is substantially open, including respective cross-arms 1110 and a central hub 1112 to provide for connection to motor shaft 200. If desired, cross arms 1110 can also be configured as fan blades, to facilitate cooling interior chamber 1104.

A stator 1114 suitably comprising a laminate core 1116, and respective windings 1118. Windings 1118 are suitably the type previously described. Core 1116 includes a central axial through-bore 1322.

Stator 1114 is secured to engine 202 by a mount 1122. Mount 1122 includes a central axial stem, 1124, with an internal bore 1126.

In assembly, mount 1122 is bolted to engine 202 with engine shaft 200 journaled through bore 1126. Bore 1126 is somewhat larger in diameter than is motor shaft 200, so that motor shaft 200 can rotate freely therein. Stator 1114 is disposed on mount 1122, with stem 1124 received in central bore 1322 of stator 1114. Stem 1124 suitably effects an interference fit with bore 1322 although, adhesive can also be used, if desired.

Rotor 1100 is disposed over stator 1114 and fastened to engine shaft 200. Stator 1114 is received within the interior of cavity 1104. Hub 1112 includes a central bore 1128 disposed in registry with a threaded axial bore 1130 in motor shaft 200. A bolt 1302 is received through bore 1128 and engaged in threaded bore 1130 to fasten rotor 1100 to shaft 200 for rotation therewith.

External rotor 1100 and internal stator 1114 provide for a particularly compact generator unit. In some instances, the entire assembly can be disposed in the fly-wheel and magneto area of a small engine, such that the generator is provided with no apparent external components. In addition, the assembly can be incorporated into a pull cable starter. As shown in FIG. 19(a), a pull cable assembly and suitably including a ratchet and overriding spring-type clutch and pulley 1328, is secured to, and in axial alignment with rotor 1100, over hub 1112. When the rope is pulled, and pulley rotated, concomitant rotation of rotor 1100 is effected.

It will be understood that while various of the conductors and connections are shown in the drawing as single lines, they are not so shown in a limiting sense, and may comprise plural connections or connectors as understood in the art. Similarly, various power connections and various control lines and the like various elements had been omitted from the drawing for the sake of clarity. Further, the above description is of preferred exemplary embodiments of the invention, and the invention is not limited to the specific forms shown. Modifications may be made in the design and arrangement of the elements in the scope of the invention, as expressed in the claims.

We claim:

1. A machine comprising a stator and a rotor, the stator including a plurality of windings, and the rotor comprising a body of soft-magnetic material with a plurality of permanent magnets in a surface disposed proximate to the stator, separated from the stator by a predetermined gap distance, such that relative motion of the rotor and stator causes magnetic flux from the permanent magnets to interact with and induce current in the stator windings, wherein the permanent magnets are high energy product magnets with a predetermined surface area, and the permanent magnets are mounted in insets formed in the rotor surface proximate to the stator, the rotor surface proximate to the stator includes portions between the insets to form respective consequence poles, each consequence pole having a predetermined surface area, and the magnets are disposed within the insets, separated from adjacent consequence poles by a predetermined distance, improved wherein:

the surface area of the permanent magnets proximate to the stator is greater than the surface area of the consequence poles proximate to the stator by the ratio of the flux density produced by the permanent magnet to the allowed flux density of the consequence pole;

the permanent magnets have a flux density of at least on the order five kilogauss;

the insets are symmetrically disposed in the rotor surface proximate to the stator, the consequence poles are symmetrically disposed in the rotor surface proximate to the stator and the permanent magnets are centrally disposed within the insets;

the distance separating the permanent magnets from the consequence poles is greater than the distance separating the rotor surface from the stator;

the rotor comprises a hollow cylinder with the magnets mounted on an internal surface of the cylinder, and the stator is concentrically disposed within the cylinder;

the stator is generally annular with a central aperture and the rotor is concentrically disposed for rotation within the aperture, the rotor being adapted for mounting on a shaft journaled through the stator central aperture; and the stator includes a first winding for generating a relatively high voltage low amperage signal and a second winding for generating a relatively low voltage high amperage signal;

and the machine further including:

a first rectification circuit, responsive to signals from the first stator winding, for generating a relatively high voltage low amperage DC signal; and a second rectification circuit, responsive to signals from the second stator winding, for generating a relatively low voltage high amperage DC signal.

2. The machine of claim 1 further comprising an engine to rotate the rotor.

3. The machine of claim 1 further improved wherein the stator includes:

a soft magnetic core;

a first 3-phase star winding, each phase of the first winding including a predetermined number of turns corresponding to a first predetermined voltage output; and a second 3-phase star winding, each phase of the second winding including a predetermined number of turns corresponding to a second predetermined voltage output;

the corresponding phases of the respective 3-phase windings grouped together as a unit and wound about the core such that the corresponding phases of the respective 3-phase windings coils are wound in continuous thermal contact with each other.

4. The machine of claim 3 wherein the first predetermined output voltage is on the order of 110 volts, and the second predetermined output voltage is on the order of 12 volts.

5. The machine of claim 3 further improved wherein each phase of at least one winding includes a first portion defined by a tap to provide a third predetermined voltage output.

6. The machine of claim 5 further comprising:

a switch, for selectively effecting a connection to one of the second or third predetermined voltage outputs; and a rectification circuit, receptive of signals from the switch for generating DC signals.

7. The machine of claim 5 further improved wherein the first predetermined output voltage is on the order of 110 volts, the second predetermined output voltage is on the order of 24 volts, and the third predetermined output voltage is on the order of 12 volts.

8. The machine of claim 1 wherein the machine includes respective output terminals; and means for disabling the rectification circuit in response to a reverse polarity voltage in excess of a predetermined level, across the output terminals.

9. The machine of claim 8 wherein the machine further includes:

means for enabling the rectification circuit in response to voltage in excess of a predetermined level, across the output terminals.

10. The machine of claim 1 further improved wherein:

the second winding includes a first portion defined by a tap to provide a third predetermined voltage output; and the machine further comprises:

a switch, for selectively effecting a connection between the second rectification circuit and one of the second or third predetermined voltage outputs.

11. The machine of claim 1 further improved in comprising an inverter, responsive to the DC signal, for generating an AC signal.

12. The machine of claim 11 further improved wherein the inverter comprises a variable frequency inverter, responsive to indicia of the current drawn from the inverter, for generating an AC signal having a frequency in accordance with the current drawn.

13. The machine of claim 11 further improved wherein the inverter comprises a variable frequency inverter, responsive to indicia of the DC voltage level, for generating an AC signal having a frequency in accordance with the DC voltage.

\* \* \* \* \*